United States Patent
Cha et al.

(10) Patent No.: US 11,869,116 B2
(45) Date of Patent: *Jan. 9, 2024

(54) LINE INTERLEAVING CONTROLLER, IMAGE SIGNAL PROCESSOR AND APPLICATION PROCESSOR INCLUDING THE SAME

(71) Applicant: Samsung Electronics Co., Ltd., Suwon-si (KR)

(72) Inventors: Kilhyung Cha, Seoul (KR); Jinsoo Park, Seoul (KR); Dongwoo Lee, Yongin-si (KR); Serhoon Lee, Yongin-si (KR); Sungjin Huh, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/059,607

(22) Filed: Nov. 29, 2022

(65) Prior Publication Data

US 2023/0088614 A1 Mar. 23, 2023

Related U.S. Application Data

(63) Continuation of application No. 17/136,494, filed on Dec. 29, 2020, now Pat. No. 11,514,552.

(30) Foreign Application Priority Data

Jun. 4, 2020 (KR) ........................ 10-2020-0067473

(51) Int. Cl.
*G06T 15/00* (2011.01)
*G06T 1/20* (2006.01)
(Continued)

(52) U.S. Cl.
CPC ................ *G06T 1/20* (2013.01); *G06F 9/544* (2013.01); *G06F 13/1647* (2013.01); *G06F 13/4282* (2013.01); *G06T 1/60* (2013.01)

(58) Field of Classification Search
CPC ......... G06T 15/005; G06T 1/20; G06T 15/04; G09G 5/363; G06F 9/3851
(Continued)

(56) References Cited

U.S. PATENT DOCUMENTS 7,362,779 B1 * 4/2008 Zabezhinsky .......... H04J 3/1611
370/512
7,847,816 B2 12/2010 Usui et al.
(Continued)

FOREIGN PATENT DOCUMENTS

JP 2013-055541 A 3/2013

*Primary Examiner* — Gordon G Liu
(74) *Attorney, Agent, or Firm* — Harness, Dickey & Pierce, P.L.C.

(57) ABSTRACT

An image signal processor includes a line interleaving controller and an image signal processor core. The line interleaving controller receives a plurality of image data lines included in an image frame, generates one or more virtual data lines corresponding to the image frame, and outputs the plurality of image data lines and the virtual data lines sequentially line by line. The image signal processor core includes at least one pipeline circuit. The pipe line circuit includes a plurality of processing modules serially connected to sequentially process data lines received from the line interleaving controller. The line interleaving controller processes one or more end image data lines included in an end portion of the image frame based on the virtual data lines. Interference or collision between channels is reduced or prevented by processing the end image data lines in synchronization with the virtual data lines.

19 Claims, 22 Drawing Sheets

(51) Int. Cl.
  *G06T 1/60*   (2006.01)
  *G06F 9/54*   (2006.01)
  *G06F 13/42*  (2006.01)
  *G06F 13/16*  (2006.01)

(58) Field of Classification Search
  USPC .......................................................... 345/522
  See application file for complete search history.

(56) References Cited

U.S. PATENT DOCUMENTS

| | | |
|---|---|---|
| 9,001,227 B2 | 4/2015 | Aleksic et al. |
| 9,307,144 B2 | 4/2016 | Tanaka et al. |
| 10,277,833 B2 | 4/2019 | Zhu et al. |
| 10,282,805 B2 | 5/2019 | Baek et al. |
| 10,362,267 B2 | 7/2019 | Cha et al. |
| 2013/0235149 A1 | 9/2013 | Tanaka et al. |
| 2016/0227160 A1* | 8/2016 | Baek .................. G06F 13/4265 |
| 2020/0210351 A1* | 7/2020 | Mody ...................... H04N 5/77 |

* cited by examiner

3*3 BOX FILTERING (DSZ=1)

5*5 BOX FILTERING (DSZ=2)

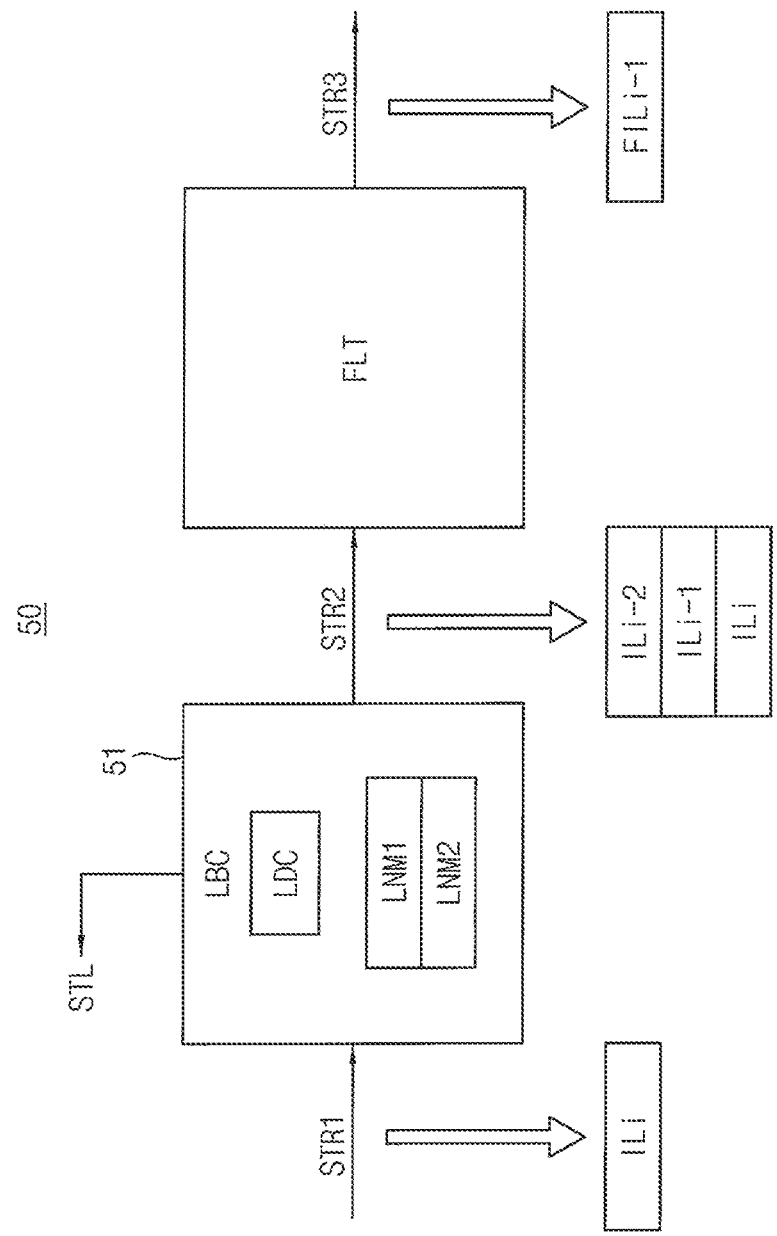

LINE INTERLEAVING CONTROLLER, IMAGE SIGNAL PROCESSOR AND APPLICATION PROCESSOR INCLUDING THE SAME

CROSS-REFERENCE TO RELATED APPLICATION

This is a continuation of U.S. application Ser. No. 17/136,494, filed Dec. 29, 2020, which claims priority to Korean Application No. 10-2020-0067473, filed on Jun. 4, 2020, the disclosures of each of which are hereby incorporated by reference in their entirety.

BACKGROUND

1. Technical Field

Example embodiments relate generally to semiconductor integrated circuits, and more particularly to a line interleaving controller and an image signal processor including the line interleaving controller.

2. Discussion of the Related Art

An image signal processor may process a plurality of input images from a plurality of channels by adopting a time-division multiplexing (TDM) scheme, using a frame memory. When the image signal processor uses an external frame memory for processing of the TDM scheme, the image signal processor stores the input images in the external frame memory frame by frame. In some embodiments, the input images are stored in and then read out from the external frame memory through a bus system and power consumption of a system including the image signal processor may be increased due to bus transaction. When the frame memory is included in the image signal processor, size and/or cost of the image signal processor may be increased.

SUMMARY

Some example embodiments may provide a line interleaving controller capable of efficiently supporting time-division multiplexing (TDM) by units of lines (that is, line by line), and an image signal processor including the line interleaving controller.

According to example embodiments, an image signal processor includes a line interleaving controller and an image signal processor core. The line interleaving controller receives a plurality of image data lines included in an image frame, generates one or more virtual data lines corresponding to the image frame, and outputs the plurality of image data lines and the virtual data lines sequentially line by line. The image signal processor core includes at least one pipeline circuit. The pipe line circuit includes a plurality of processing modules serially connected to sequentially process data lines received from the line interleaving controller. The line interleaving controller processes one or more end image data lines included in an end portion of the image frame based on the virtual data lines.

According to example embodiments, a line interleaving controller includes a buffer circuit, a virtual line generator, a multiplexer and a control logic circuit. The buffer circuit buffers a plurality of first image data lines included in a first image frame received through a first channel and a plurality of second image data lines included in a second image frame received through a second channel to selectively output each first image data line or each second image data line. The virtual line generator generates first virtual data lines corresponding the first image frame and second virtual data lines corresponding to the second image frame. The multiplexer outputs a stream signal by selecting an output of the buffer circuit and an output of the virtual line generator. The control logic circuit controls the buffer circuit, the virtual line generator and the multiplexer, The first virtual data lines are used to process one or more end image data lines included in an end portion of the first image frame, and the second virtual data lines are used to process one or more end image data lines included in an end portion of the second image frame.

According to example embodiments, an application processor includes a bus, an image signal processor connected to the bus, and a central processing unit (CPU) connected to the bus to control the image signal processor. The image signal processor includes the line interleaving controller configured to receive a plurality of image data lines included in an image frame, generate one or more virtual data lines corresponding to the image frame, and output the plurality of image data lines and the virtual data lines sequentially line by line, and an image signal processor core including at least one pipeline circuit, the pipe line circuit including a plurality of processing modules serially connected to sequentially process data lines received from the line interleaving controller, the line interleaving controller configured to process one or more end image data lines included in an end portion of the image frame based on the virtual data lines.

The line interleaving controller according to example embodiments may reduce or prevent interference or collision between channels and more efficiently support the TDM by units of lines (line by line) by generating the virtual data lines for processing of the end image data lines that are included in the end portion of the image frame and providing the virtual data lines to the image signal processor core including the pipeline structure.

The images signal processor including the line interleaving controller according to example embodiments may reduce or minimize access to an external memory and reduce or prevent interference between channels by performing pipeline processing with the efficient TDM by units of lines (line by line), thereby reducing power consumption and/or enhancing performance of the image signal processor and a system such as the application processor including the image signal processor.

BRIEF DESCRIPTION OF THE DRAWINGS

Example embodiments of the present disclosure will be more clearly understood from the following detailed description taken in conjunction with the accompanying drawings.

FIG. 9A is a block diagram illustrating an example of a delayed processing module.

DETAILED DESCRIPTION OF EXAMPLE EMBODIMENTS

Figure 1:
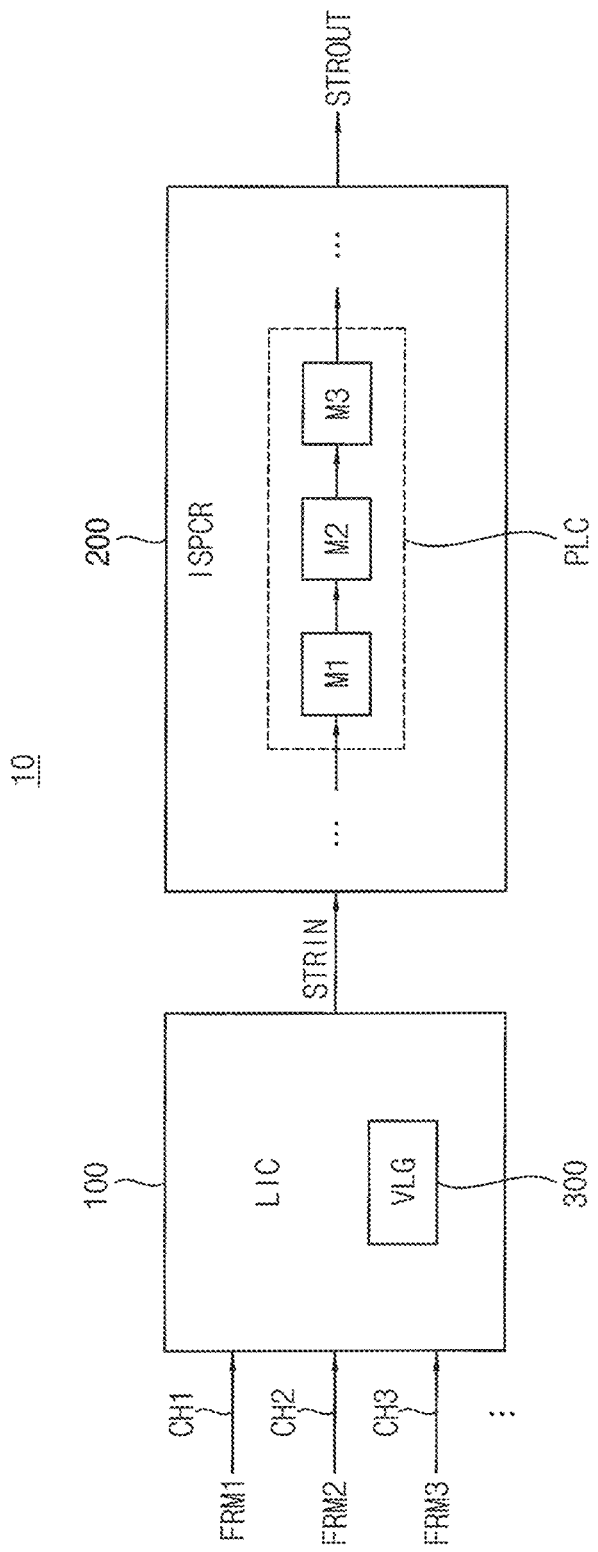
FIG. 1 is a block diagram illustrating an image signal processor according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating an image signal processor according to example embodiments.

Referring to FIG. 1, an image signal processor 10 may include a line interleaving controller LIC 100 and an image signal processor core ISPCR 200.

The line interleaving controller 100 may receive a plurality of image data lines included in an image frame, generate one or more virtual data lines corresponding to the image frame, and output the plurality of image data lines and the virtual data lines sequentially line by line. The line interleaving controller 100 may include a virtual line generator 300 to generate the virtual data lines. Example embodiments of a detailed configuration of the line interleaving controller 100 will be described with reference to FIG. 14.

The line interleaving controller 100 may output the plurality of image data lines and the virtual data lines as a single stream signal STRIN. In other words, as will be described with reference to FIGS. 3 and 4, the stream signal STRIN output from the line interleaving controller 100 may sequentially include each of the plurality of image data lines and each of the virtual data lines. The stream signal STRIN is provided as an input of the image signal processor core 200, and the stream signal STRIN may be referred to as the input stream signal STRIN.

In some example embodiments, the line interleaving controller 100 may receive a plurality of image frames FRM1, FRM2 and FRM3 through a plurality of channels CH1, CH2 and CH3, respectively. Resolutions, frame rates, etc. of the plurality of image frames FRM1, FRM2 and FRM3 may be determined independently, which may be equal to or different from each other. FIG. 1 illustrates a non-limiting example of three image frames received from three channels, and the line interleaving controller 100 may receive two image frames, or four or more image frames through a corresponding number of channels.

The virtual line generator 300 may generate the virtual data lines respectively corresponding to the plurality of image frames FRM1, FRM2 and FRM3, and the line interleaving controller 100 may transfer the plurality of image data lines included in the plurality of image frames FRM1, FRM2 and FRM3 and the virtual data lines sequentially line by line with a time-division multiplexing (TDM) scheme to the image signal processor core 200. In other words, the input stream signal STRIN output from the line interleaving controller 100 may sequentially include each of the plurality of image data lines received through the plurality of channels CH1, CH2 and CH3 and each of the virtual data lines generated by the virtual line generator 300.

For example, as will be described with reference to FIGS. 5 and 6, the line interleaving controller 100 may receive a plurality of first image data lines included in the first image frame FRM1 through the first channel CH1 and a plurality of second image data lines included in the second image frame FRM2 through the second channel CH2. In some embodiments, the virtual line generator 300 in the line interleaving controller 100 may generate one or more first virtual data lines corresponding to the first image frame FRM1 and one or more second virtual data lines corresponding to the second image frame FRM2. The line interleaving controller 100 may transfer the input stream signal STRIN to the image signal processor core 200 such that the input stream signal STRIN includes the plurality of first image data lines, the plurality of second image data lines, the first virtual data lines and the second virtual data lines sequentially line by line with the TDM. According to example embodiments, the virtual line generator 300 may not generate virtual data lines corresponding to a particular image frame.

The image signal processor core 200 may include at least one pipeline circuit PLC. The pipe line circuit PLC may include a plurality of processing modules M1~M3 that are serially connected to sequentially process data lines received from the line interleaving controller 100.

The plurality of processing modules M1~M3 in the pipeline circuit PLC have different processing functions to sequentially process each data line. A processing result of the previous processing module may be transferred to the next processing module sequentially. The last processing module may output the final result of the pipeline processing. The plurality of processing modules M1~M3 may process respective data lines in the same time and thus the entire processing time of the plurality of data lines may be reduced using the structure of the pipeline circuit PLC.

In addition, the image signal processor core 200 may process one or more end image data lines included in an end portion of each image frame based on the virtual data lines. The image signal processor core 200 may generate an output stream signal STROUT that sequentially includes processed image data lines.

As such, the line interleaving controller 100 according to example embodiments may reduce or prevent interference or collision between channels and efficiently support TDM by units of lines by generating the virtual data lines for processing of the end image data lines that are included in the end portion of the image frame and providing the virtual data lines to the image signal processor core including the pipeline structure. The images signal processor core 200 may reduce or minimize access to an external memory and/or reduce or prevent interference between channels by performing pipeline processing with the efficient TDM by units of lines, thereby reducing power consumption and/or enhancing performance of the image signal processor 10 and a system such as the application processor including the image signal processor 10.

Figure 2A:
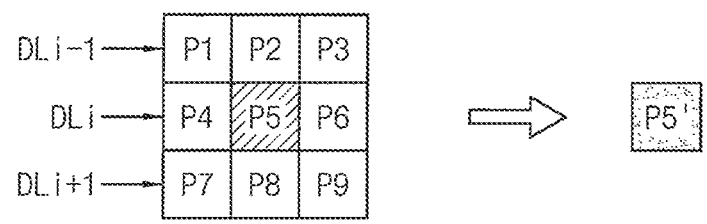
FIGS. 2A and 2B are diagrams for describing delayed line-by-line processing of an image signal processor according to example embodiments.
Figure 2B:
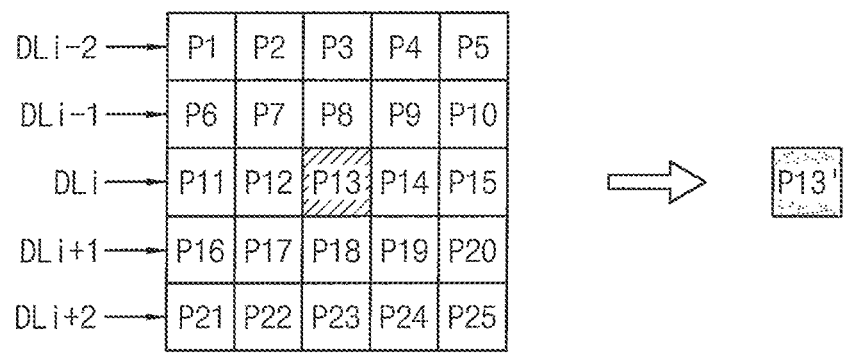

FIGS. 2A and 2B are diagrams for describing delayed line-by-line processing of an image signal processor according to example embodiments.

FIG. 2A illustrates only nine pixel data P1~P9 used in 3*3 box filtering among many pixel data included in a single image frame.

An example processing module in the image signal processor core may process centered pixel data P5 using neighboring pixel data P1~P4 and P6~P9 to output processed pixel data P5'.

When the image frame is provided line by line, to process the centered pixel data P5 in the i-th data line DLi, the example processing module requires the pixel data P7, P8 and P9 in the (i+1)-th data line DLi+1 that are received after the i-th data line DLi in addition to the pixel data P1, P2 and P3 in the (i−1)-th data line DLi−1 that are received before the present i-th data line DLi. In other words, the example processing module may perform a delayed filtering operation on the target data line DLi after receiving the one delayed data line DLi+1 that is received after the target data line DLi.

As such, a delay size DSZ indicating a number of the delayed data line DLi+1 required for processing the target data line DLi may be one in case of the 3*3 box filtering.

FIG. 2B illustrates only nine pixel data P1~P25 used in 5*5 box filtering among many pixel data included in a single image frame.

The example processing module in the image signal processor core may process centered pixel data P13 using neighboring pixel data P1~P12 and P14~P25 to output processed pixel data P5'.

When the image frame is provided line by line, to process the centered pixel data P5 in the i-th data line DLi, the example processing module requires the pixel data P16~20 in the (i+1)-th data line DLi+1 and the pixel data P21~P25 in the (i+2)-th data line DLi+2 that are received sequentially after the i-th data line DLi in addition to the pixel data P1~P5 in the (i−2)-th data line DLi−2 and the pixel data p6~P10 in the (i−1)-th data line DLi−1 that are received before the present i-th data line DLi. In other words, the example processing module may perform a delayed filtering operation on the target data line DLi after receiving the two delayed data lines DLi+1 and DLi+2 that are received after the target data line DLi.

As such, the delay size DSZ indicating a number of the delayed data lines DLi+1 and DLi+2 required for processing the target data line DLi may be two in case of the 5*5 box filtering.

The 3*3 box filtering and the 5*5 box filtering are described as examples with reference to FIGS. 2A and 2B, and example embodiments are not limited thereto. Example embodiments may be applied to the vertical filtering of n*1 window and the box filtering of n*m where each of n and m is an integer greater than one. Hereinafter, an example processing module performing the delayed filtering operation may be referred to as a delayed processing module. The delay size DSZ of the delayed processing module may be referred to as a module delay size and the entire delay size of the image signal processor core may be referred to as a core delay size.

Figure 3:
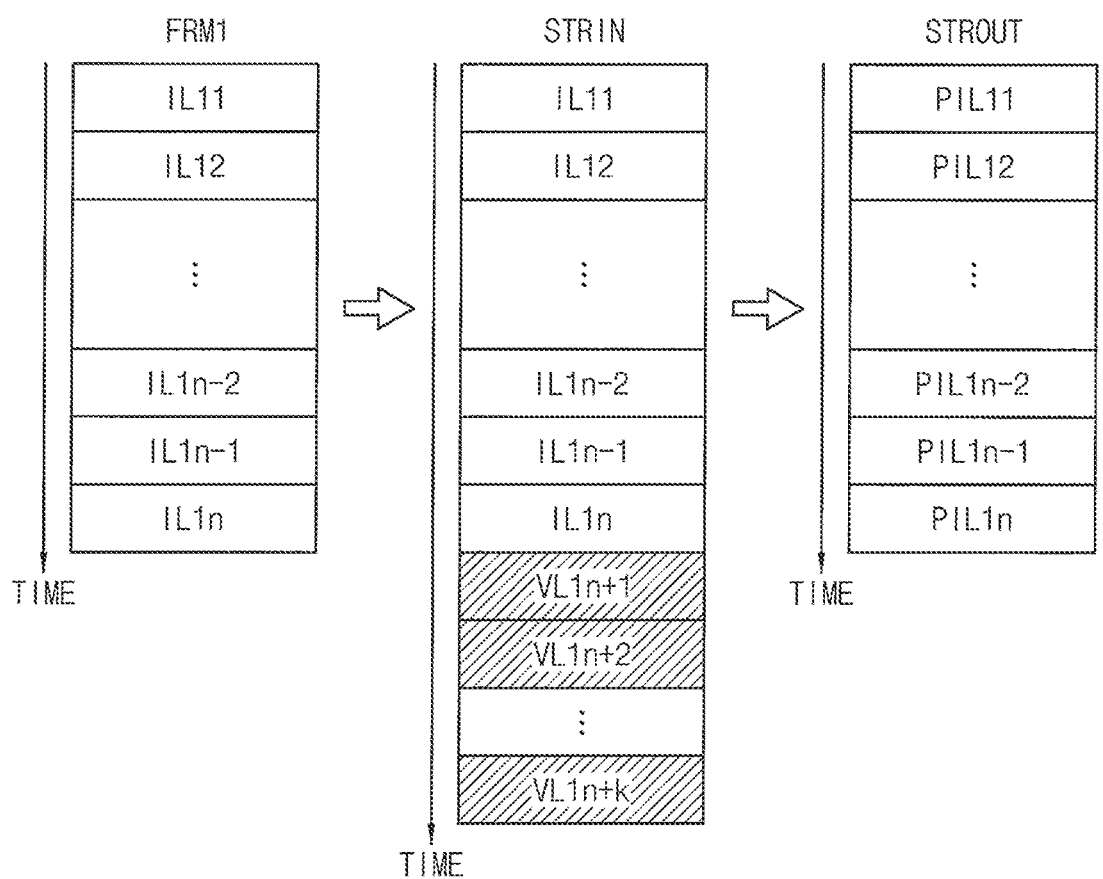
FIGS. 3 and 4 are diagrams illustrating example embodiments of a data flow by an image signal processor according to example embodiments.
Figure 4:
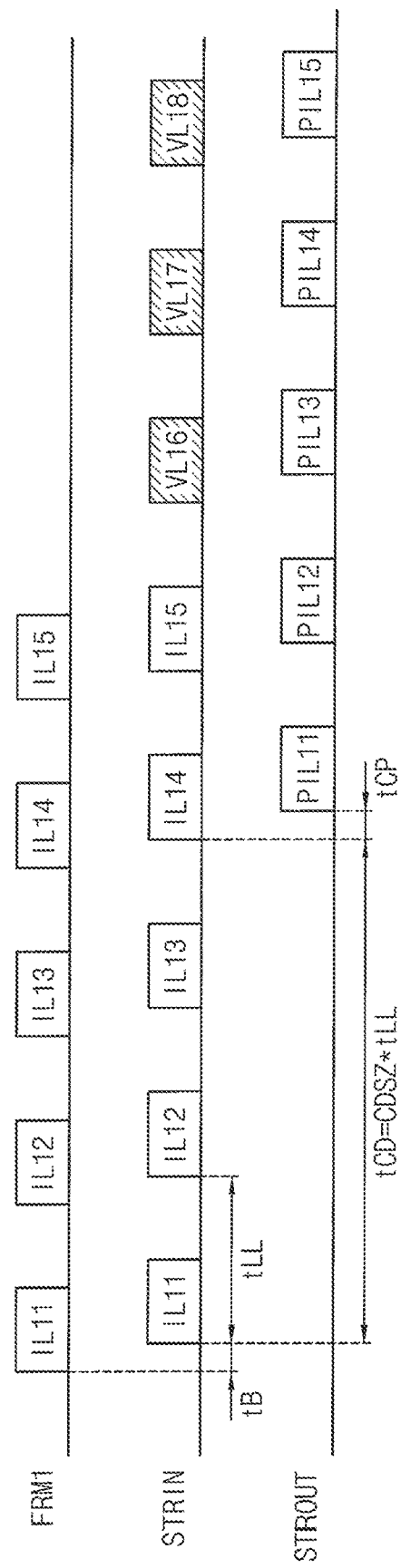

FIGS. 3 and 4 are diagrams illustrating example embodiments of a data flow by an image signal processor according to example embodiments.

Referring to FIGS. 1 and 3, the first image frame FRM1 may be provided to the image signal processor 10 through the first channel CH1. The first image frame FRM1 may include a plurality of first image data lines IL11~IL1n, and the plurality of first image data lines IL11~IL1n may be provided to the line interleaving controller 100 by units of lines, that is, line by line.

The virtual line generator 300 in the line interleaving controller 100 may generate and output first virtual data lines VL1n+1~VL1n+k such that a number k of the first virtual data lines VL1n+1~VL1n+k corresponds to a core delay size CDSZ. As will be described with reference to FIGS. 7 and 8, the core delay size CDSZ may indicate a sum of the module delay sizes of the delayed processing modules included in a pipeline path from input to output of the image signal processor core 200.

The line interleaving controller 100 may generate an input stream signal STRIN by sequentially outputting the plurality of first image data lines IL11~IL1n and the first virtual data lines VL1n+1~VL1n+k by units of lines.

The image signal processor core 200 may perform processing on the fly based on the plurality of first image data lines IL11~IL1n and the first virtual data lines VL1n+1~VL1n+k in the input stream signal STRIN and generate an output stream signal STROUT by processing and outputting first processed image data lines PIL11~PIL1n.

FIG. 4 illustrates an example that the first image frame FRM1 includes the five first image data lines IL11-IL15 and one or more end image data lines included in the end portion of the first image frame FRM1 are processed using the three virtual data lines VL16~VL18, but example embodiments are not limited thereto. The number of the first image data lines included in the first image frame FRM1 may be determined variously depending on the resolution of an image received by the image signal processor 10, and the number of the first virtual data lines may be determined variously depending on the configuration of the image signal processor core 200.

In FIG. 4, tB indicates a buffering time of the line interleaving controller 100, tLL indicates a line time interval between the two adjacent data lines sequentially output from the line interleaving controller 100, tCD indicates a line delay time of the image signal processor core 200, and tCP indicates a core processing time of the image signal processor core 200. The line delay time tCD may be represented by a multiplication CDSZ*tLL of the core delay size CDSZ and the line time interval tLL.

As illustrated in FIG. 4, the core delay size CDSZ may be three and also the number of the first virtual data lines VL16~VL18 may be three. In other words, the number of the first virtual data lines VL16~VL18 may be equal to the core delay size CDSZ.

The first processed image data lines PIL11~PIL15 correspond to the first image data lines IL11~IL15 of the first image frame FRM1. The virtual data lines VL16~VL18 are used and consumed in processing the end image data lines, and thus the data lines corresponding to the virtual data lines VL16~VL18 are not included in the output stream signal STROUT.

Figure 5:
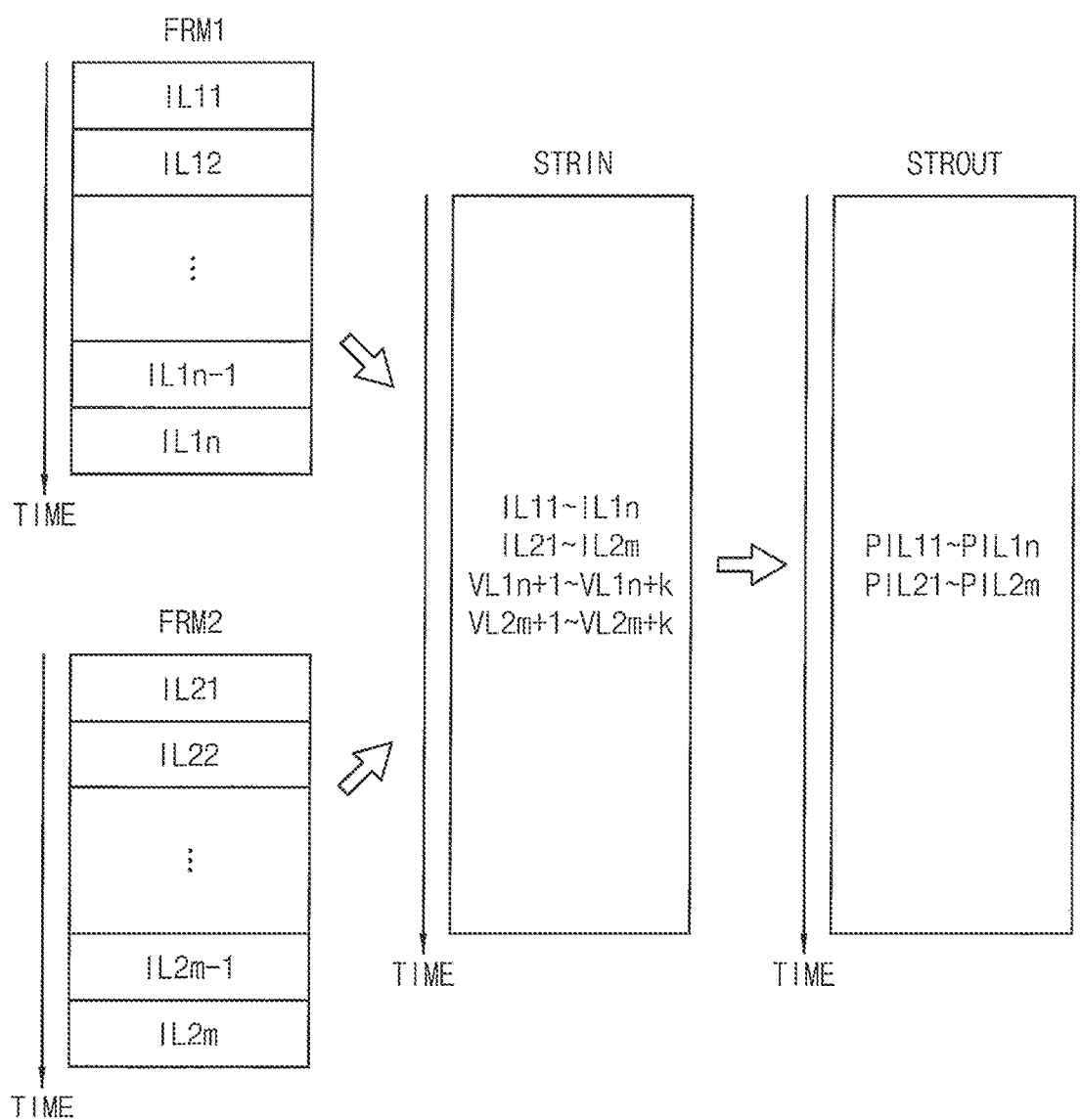
FIGS. 5 and 6 are diagrams illustrating example embodiments of a data flow by an image signal processor according to example embodiments.
Figure 6:
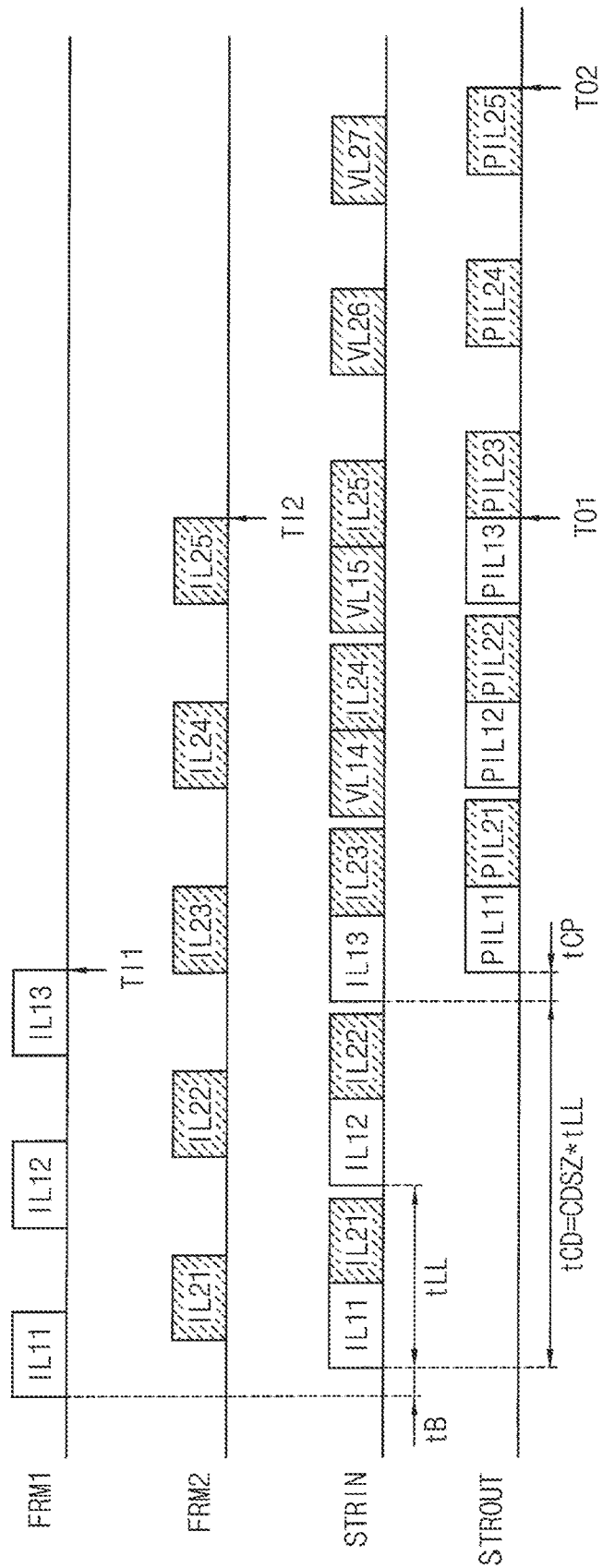

FIGS. 5 and 6 are diagrams illustrating example embodiments of a data flow by an image signal processor according to example embodiments.

Referring to FIGS. 1 and 5, the first image frame FRM1 and the second image frame FRM2 may be provided to the image signal processor 10 through the first channel CH1 and the second channel CH2, respectively. The first image frame FRM1 may include a plurality of first image data lines IL11~IL1n, and the plurality of first image data lines IL11~IL1n may be provided to the line interleaving controller 100 by units of lines, that is, line by line. The second image frame FRM2 may include a plurality of second image data lines IL21~IL2m, and the plurality of second image data lines IL21~IL2m may be provided to the line interleaving controller 100 by units of lines. According to the resolutions of the first image frame FRM1 and the second image frame FRM2, the number n of the first image data lines IL11~IL1n and the number m of the second image data lines IL21~IL2m may be equal to or different from each other.

The virtual line generator 300 in the line interleaving controller 100 may generate and output first virtual data lines VL1n+1~VL1n+k and second virtual data lines VL2m+1~VL2m+k such that a number k of each of the first virtual data lines VL1n+1~VL1n+k and the second virtual data lines VL2m+1~VL2m+k corresponds to a core delay size CDSZ. As will be described with reference to FIGS. 7 and 8, the core delay size CDSZ may indicate a sum of the module delay sizes of the delayed processing modules included in a pipeline path from input to output of the image signal processor core 200.

The line interleaving controller 100 may generate an input stream signal STRIN by sequentially outputting the plurality of first image data lines IL11~IL1n, the plurality of second image data lines IL21~IL2m, the first virtual data lines VL1n+1~VL1n+k and the second virtual data lines VL2m+1~VL2m+k by units of lines.

The image signal processor core 200 may perform processing on the fly based on the plurality of first image data lines IL11~IL1n, the plurality of second image data lines IL21~IL2m, the first virtual data lines VL1n+1~VL1n+k and the second virtual data lines VL2m+1~VL2m+k in the input stream signal STRIN and generate an output stream signal STROUT by processing and outputting first processed image data lines PIL11~PIL1n and second processed image data lines PIL21~PIL2m.

FIG. 6 illustrates an example that the first image frame FRM1 includes the three first image data lines IL11~IL13, the second image frame FRM2 includes the five second image data lines IL21~IL25 and one or more end image data lines included in the end portion of the first image frame FRM1 and the second image frame FRM2 are processed using the two first virtual data lines VL14 and VL15 and the two second virtual data lines VL26 and VL27, but example embodiments are not limited thereto. The number of the first image data lines included in the first image frame FRM1 and the number of the second image data lines included in the second image frame FRM2 may be determined variously depending on the resolution of images received by the image signal processor 10, and the number of the first virtual data lines and the number of the second virtual data lines may be determined variously depending on the configuration of the image signal processor core 200.

In FIG. 6, tB indicates a buffering time of the line interleaving controller 100, tLL indicates a line time interval between the two adjacent data lines of the first image frame sequentially output from the line interleaving controller 100, tCD indicates a line delay time of the image signal processor core 200, and tCP indicates a core processing time of the image signal processor core 200.

The line delay time tCD may be represented by a multiplication CDSZ*tLL of the core delay size CDSZ and the line time interval tLL, but example embodiments are not limited thereto. The line time interval tLL of the first image data lines included in the first image frame FRM1 and the line time interval of the second image data lines included in the second image frame FRM2 may be determined variously. For example, the input stream signal STRIN may include sequentially two or more image data lines included in the same image frame, and thus the line delay time may be variable.

TI1 and TI2 indicate time points when inputs of the first image frame FRM1 and the second image frame FRM2 to the line interleaving controller 100 are completed. T01 and T02 indicate time points when outputs of the first processed image data lines PIL11~PIL13 and the second image data lines PIL21~PIL25 from the image signal processor core 200 are completed.

As illustrated in FIG. 6, the core delay size CDSZ may be two and also the number of each of the first virtual data lines VL14 and VL15 and the second virtual data lines VL26 and VL27 may be two. In other words, the number of each of the first virtual data lines VL14 and VL15 and the second virtual data lines VL26 and VL27 may be equal to the core delay size CDSZ.

The first processed image data lines PIL11~PIL13 correspond to the first image data lines IL11~IL13 of the first image frame FRM1, and the second processed image data lines PIL21~PIL15 correspond to the second image data lines IL21~IL25 of the second image frame FRM2. The first virtual data lines VL14 and VL15 and the second virtual data lines VL26 and VL27 are used and consumed in processing the end image data lines, and thus the data lines corresponding to the first virtual data lines VL14 and VL15 and the second virtual data lines VL26 and VL27 are not included in the output stream signal STROUT.

Figure 7:
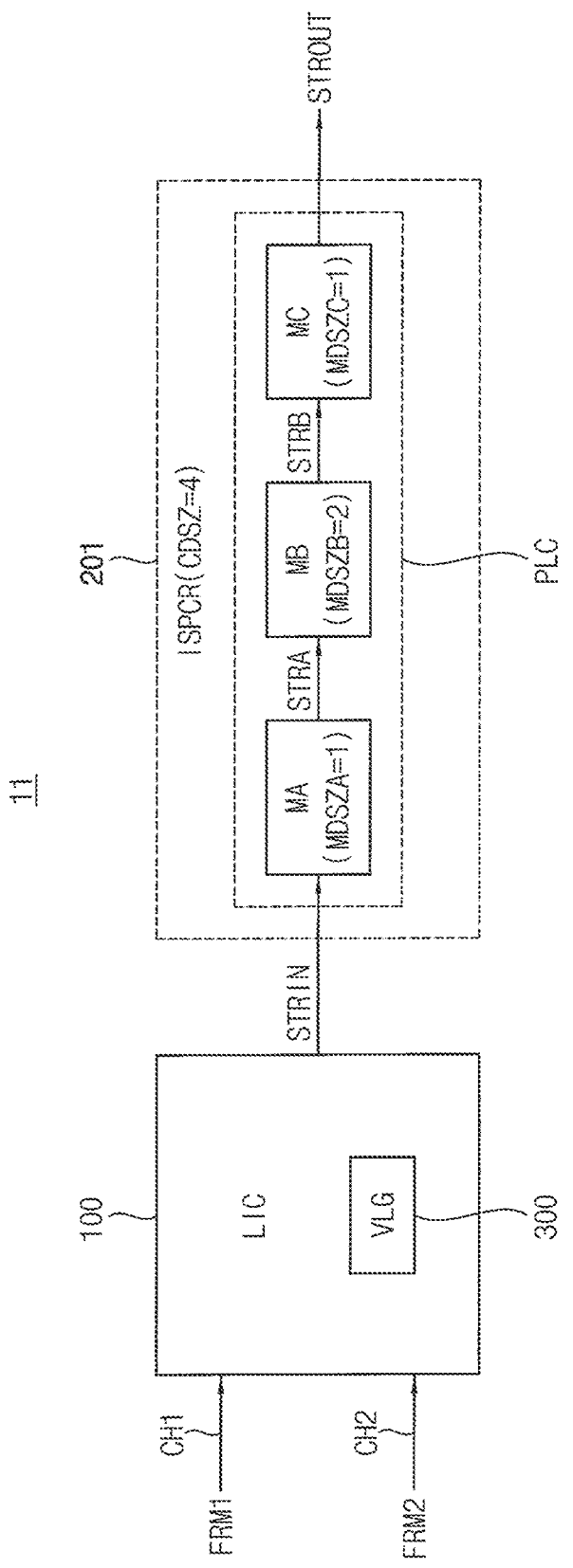
FIG. 7 is a block diagram illustrating an image signal processor according to example embodiments.

FIG. 7 is a block diagram illustrating an image signal processor according to example embodiments.

Referring to FIG. 7, an image signal processor 11 may include a line interleaving controller LIC 100 and an image signal processor core ISPCR 201.

The line interleaving controller 100 may receive a plurality of first image data lines included in a first image frame FRM1 through a first channel CH1 and a plurality of second image data lines included in a second image frame FRM2 through a second channel CH2. The line interleaving controller 100 may generate a virtual line generator VLG 300 that generates first virtual data lines corresponding to the first image frame FRM1 and second virtual data lines corresponding to the second image frame FRM2.

The line interleaving controller 100 may transfer the plurality of first image data lines, the plurality of second image data lines, the first virtual data lines and the second virtual data lines sequentially line by line with a TDM scheme to the image signal processor core 201. The line interleaving controller 100 may transfer, as an input stream signal STRIN to the image signal processor core 201, the plurality of first image data lines, the plurality of second image data lines, the first virtual data lines and the second virtual data lines.

The image signal processor core 201 may include a pipeline circuit PLC. The pipe line circuit PLC may include a plurality of processing modules M1~M3 that are serially connected to sequentially process data lines received from the line interleaving controller 100.

For example, as illustrated in FIG. 7, the pipeline circuit PLC may include a first processing module MA, a second processing module MB and a third processing module MC. The first processing module MA may process the data lines in the input stream signal STRIN to generate a first stream signal STRA, the second processing module MB may process the data lines in the first stream signal to generate a second stream signal STRB and the third processing module MC may process the data lines in the second stream signal STRB to generate an output stream signal STROUT. As such, the processing modules MA, MB and MC in the pipeline circuit PLC may perform pipeline processing of data lines included in the input stream signal STRIN.

The processing modules MA, MB and MC may be delayed processing modules performing delayed filtering operations as described with reference to FIGS. 2A and 2B. For example, the first processing module MA may has a first module delay size MDSZA of one, the second processing module MB may has a second module delay size MDSZB of two and the third processing module MC has a third module delay size MDSZC of one. As a result, a core delay size CDSZ of the pipeline circuit PLC may be four corresponding to a sum of the module delay sizes MDSZA, MDSZB and MDSZC of the processing modules MA, MB and MC included in a pipeline path from input to output of the image signal processor core 201.

The pipeline circuit PLC illustrated in FIG. 7 is a non-limiting example, and an image signal processor core included in an image signal processor according to example embodiments may have various configurations, for example, as will be described with reference to FIGS. 11 and 12.

Figure 8:
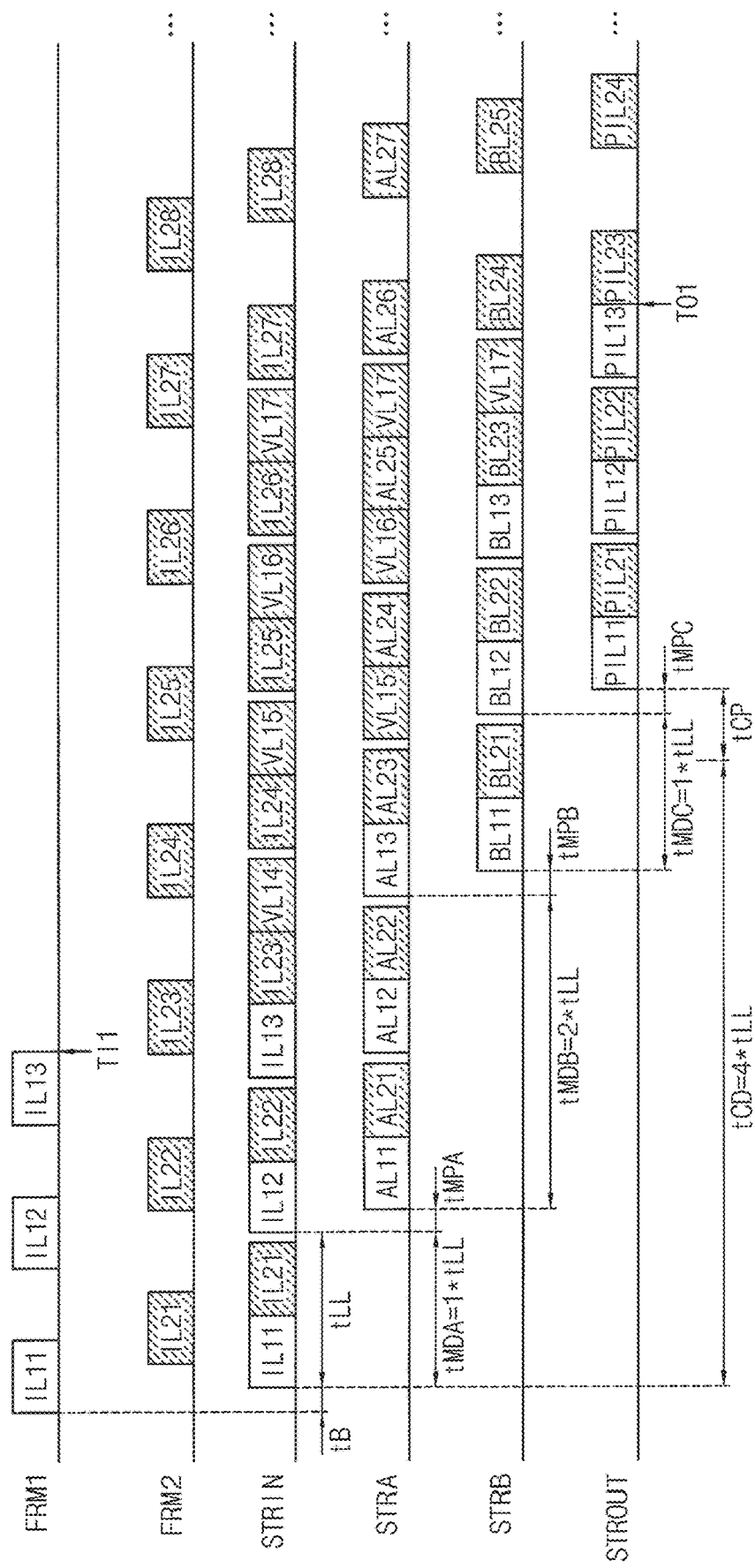
FIG. 8 is a timing diagram illustrating an example operation of the image signal processor of FIG. 7.

FIG. 8 is a timing diagram illustrating an example operation of the image signal processor of FIG. 7.

FIG. 8 illustrates an example that the first image frame FRM1 includes the three first image data lines IL11~IL13, and the second image frame FRM2 includes the eight second image data lines IL21~IL28, and the number of the first image data lines included in the first image frame FRM1 and the number of the second image data lines included in the second image frame FRM2 may be determined variously depending on the resolution of images received by the image signal processor 11. The second virtual data lines corresponding to the second image frame FRM2 are omitted in FIG. 8 for convenience of illustration and description, and example embodiments are described with respect to processing of the first image frame FRM1.

In FIG. 8, tB indicates an initial buffering time of the line interleaving controller 100, tLL indicates a line time interval between the two adjacent data lines of the first image frame sequentially output from the line interleaving controller 100, tMDA, tMDB and tMDC indicate respective line delay times of the processing modules MA, MB and MC, and tMPA, tMPB and tMPC includes respective processing times of the processing modules MA, MB and MC.

The first line delay time tMDA of the first processing module MA may be represented by a multiplication 1*tLL of the first module delay size MDSZA=1 and the line time interval tLL, the second line delay time tMDB of the second processing module MB may be represented by a multiplication 2*tLL of the second module delay size MDSZB=2 and the line time interval tLL, and the third line delay time tMDC of the third processing module MC may be represented by a multiplication 1*tLL of the third module delay size MDSZC=1 and the line time interval tLL, but example embodiments are not limited thereto. The line time interval of the first image data lines included in the first image frame FRM1 and the line time interval of the second image data lines included in the second image frame FRM2 may be determined variously. For example, the input stream signal STRIN may include sequentially two or more image data lines included in the same image frame, and thus the line delay time may be variable.

TI1 indicates a time point when input of the first image frame FRM1 to the line interleaving controller 100 is completed. T01 indicate time point when output of the first processed image data lines PIL11~PIL13 from the image signal processor core 201 is completed.

Referring to FIGS. 7 and 8, the virtual line generator 300 may generate first virtual data lines VL14~VL17 corresponding to the first image frame FRM1 and second virtual data lines (not shown) corresponding to the second image frame FRM2. The line interleaving controller 100 may generate an input stream signal STRIN by outputting the first image data lines IL1~IL3, the second image data lines IL21~IL28, the first virtual data lines VL14~VL17 and the second virtual data lines with the TDM scheme by units of lines.

The first processing module MA may perform the delayed filtering operation delayed by the first module delay size MDSZA=1 on the data lines in the input stream signal STRIN to generate the first stream signal STRA including image data lines AL11~AL13 and AL21~AL27 processed by the first processing module MA. In some example embodiments, the first processing module MA may perform the delayed filtering operation on the one first end image data line IL13 using the one first virtual data line VL14 and output the three first virtual data lines VL15~VL17, without processing, which are not used in the delayed filtering operation by the first processing module MA.

The second processing module MB may perform the delayed filtering operation delayed by the second module delay size MDSZB=2 on the data lines in the first stream signal STRA to generate the second stream signal STRB including image data lines BL11~BL13 and BL21~BL25 processed by the second processing module MB. In some example embodiments, the second processing module MB may perform the delayed filtering operation on the two end image data lines AL12 and AL13 using the two first virtual data line VL15 and VL16 and output the one first virtual data line VL17, without processing, which is not used in the delayed filtering operation by the second processing module MB.

The third processing module MC may perform the delayed filtering operation delayed by the third module delay size MDSZC=1 on the data lines in the second stream signal STRB to generate the output stream signal STROUT including image data lines PL11~PL13 and PL21~PL24 processed by the third processing module MC. In some example embodiments, the third processing module MC may perform the delayed filtering operation on the one end image data line BL13 using the one first virtual data line VL17.

As a result, the entire line delay time tCD of the image signal processor core 201 may correspond to a multiplication 4*tLL of the core delay size CDSZ=4 and the line time interval tLL. The core processing time tCP may be represented by a sum of the first module processing time tMPA, the second module processing time tMPB and the third module processing time tMPC. As described above, the line time interval may be variable.

The number of the virtual data lines may be determined variously depending on the configuration of the image signal processor core. The line interleaving controller 100 may determine a number of the virtual data lines based on the module delay sizes of the delayed processing modules where each module delay size indicates the number of the delay data lines of each delayed processing module as described above. The time interval between the virtual data lines may be determined on the input speed of the image data lines or may be determined as a predetermined or alternatively, desired time interval.

In some example embodiments, when the image signal processor core includes a single pipeline circuit, the line interleaving controller 100 may generate and output the virtual data lines such that the number of the virtual data lines is equal to a sum of the module delay sizes of the delayed processing modules included in the single pipeline circuit. For example, as described with reference to FIGS. 7 and 8, the line interleaving controller 100 includes the one pipeline circuit PLC and the core delay size CDSZ corresponding to the sum of the module delay sizes MDSZA, MDSZB and MDSZC of the delayed processing modules MA, MB and MC included in the one pipeline circuit PCL may be four. In some embodiments, the line interleaving controller 100 may generate and output the four virtual data lines VL14~VL17 corresponding to the first image frame FRM1 and the four second virtual data lines (not shown) corresponding to the second image frame FRM2.

As described with reference to FIG. 8, each delayed processing module may perform the delayed filtering operation on the end image data lines using a first number of received virtual data lines, and output a second number of the received virtual data lines without processing. Here the first number corresponds to the module delay size of the each delayed processing module, and the second number corresponds to the received virtual data lines that are not used in the delayed filtering operation of the each delayed processing module.

Figure 9B:
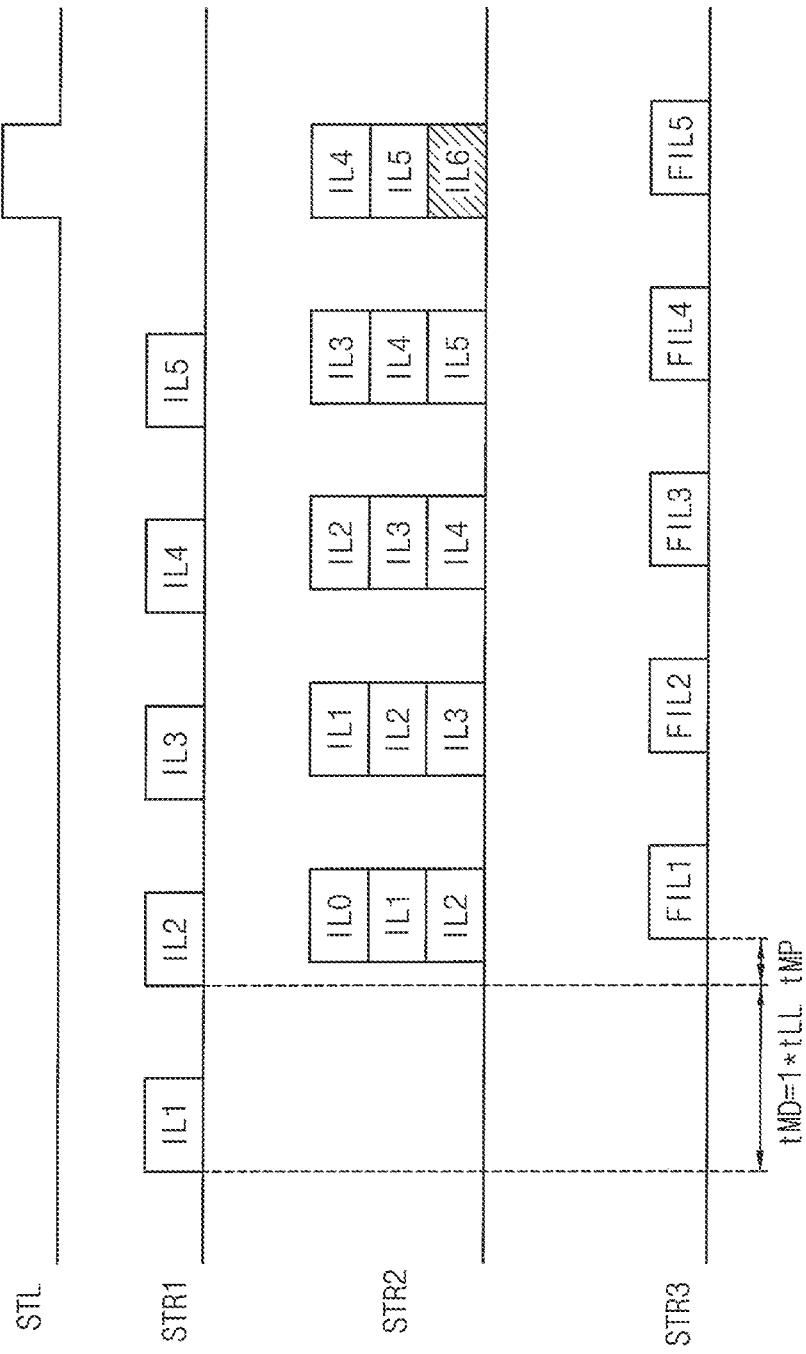
FIG. 9B is a timing diagram illustrating an operation of the delayed processing module of FIG. 9A.

FIG. 9A is a block diagram illustrating an example of a delayed processing module, and FIG. 9B is a timing diagram illustrating an operation of the delayed processing module of FIG. 9A. FIGS. 9A and 9B illustrate, as a non-limiting example, that the module delay size MDSZ is one.

Referring to FIG. 9A, a delayed processing module 50 may include a line buffer control circuit LBC 51 and a filtering circuit FLT.

The line buffer control circuit 51 may buffer data lines in a first stream signal STR1 provided from a previous stage (another delayed processing module or an input channel itself) to output a second stream signal STR2. The filtering circuit FLT may perform a filtering operation based on data lines in the second stream signal STR2 to generate a third stream signal STR3 including processed or filtered data lines.

The line buffer control circuit 51 may include two line buffers LNM1 and LNM2 to store two image data lines previously received, and a line drain circuit LDC to process one end image data line of the image frame.

The line buffer control circuit 51 may, in synchronization with the i-th image data line ILi in the first stream signal STR1, output the (i−2)-th and (i−1)-the image data lines ILi−2 and ILi−1 stored in the two line buffers LNM1 and LNM2, and simultaneously the i-th image data line ILi.

The filtering circuit FLT may perform the 3*3 box filtering as described with reference to FIG. 2A based on the (i−2)-th, (i−1)-th and i-th image data lines that are received simultaneously and output the (i−1)-th filtered image data line FILi−1.

FIG. 9B illustrates an example that an image frame includes five image data lines IL1~IL5 for convenience of illustration and description. tLL indicates a line time interval between two adjacent data lines, tMD indicates a line delay time of the delayed processing module 50, and tMP indicates a processing time of the delayed processing module 50. The line delay time tMD may be represented by the module delay size MDSZ-1 and the line time interval tLL.

As illustrated in FIG. 9B, the delayed processing module 50 may perform the delayed filtering operation on the (i−1)-th image data line ILi−1 in synchronization with the i-th image data line ILi received through the first stream signal STR1. In some embodiments, the delayed filtering operation on the end image data line IL5 is performed by the data line IL6 that is provided from the line drain circuit LDC because the data line for processing the end image data line IL5 is not received from the previous stage.

While the delayed filtering operation is performed on the end image data line IL5, the delayed processing module 50 may not receive the data line from the previous stage, and thus the line buffer control circuit 51 has to activate a stall signal STL that is provided to the previous stage to indicate that the delayed processing module cannot receive the data line.

When the delayed processing module 50 itself controls the processing timing of the end image data lines, there are many problems for the TDM scheme with respect to multiple inputs from multiple channels. The stall signal STL has to be activated to reduce or prevent the transfer of next data lines from the previous stage while the delayed processing module processes the end image data lines. In some embodiments, the buffers of the previous stage may be filled undesirably because the image data lines are transferred through the channel continuously. In addition, the end image data lines may not be processed timely due to the rushed image data lines from a particular channel. The problems become more serious if a plurality of delayed processing modules exists in the pipeline path. As such, the end image data lines may not be processed properly because the states of other processing modules and buffers storing the data from the channels may not be available when the line buffer control circuit 51 determines the timing of processing the end image data lines.

Figure 10A:
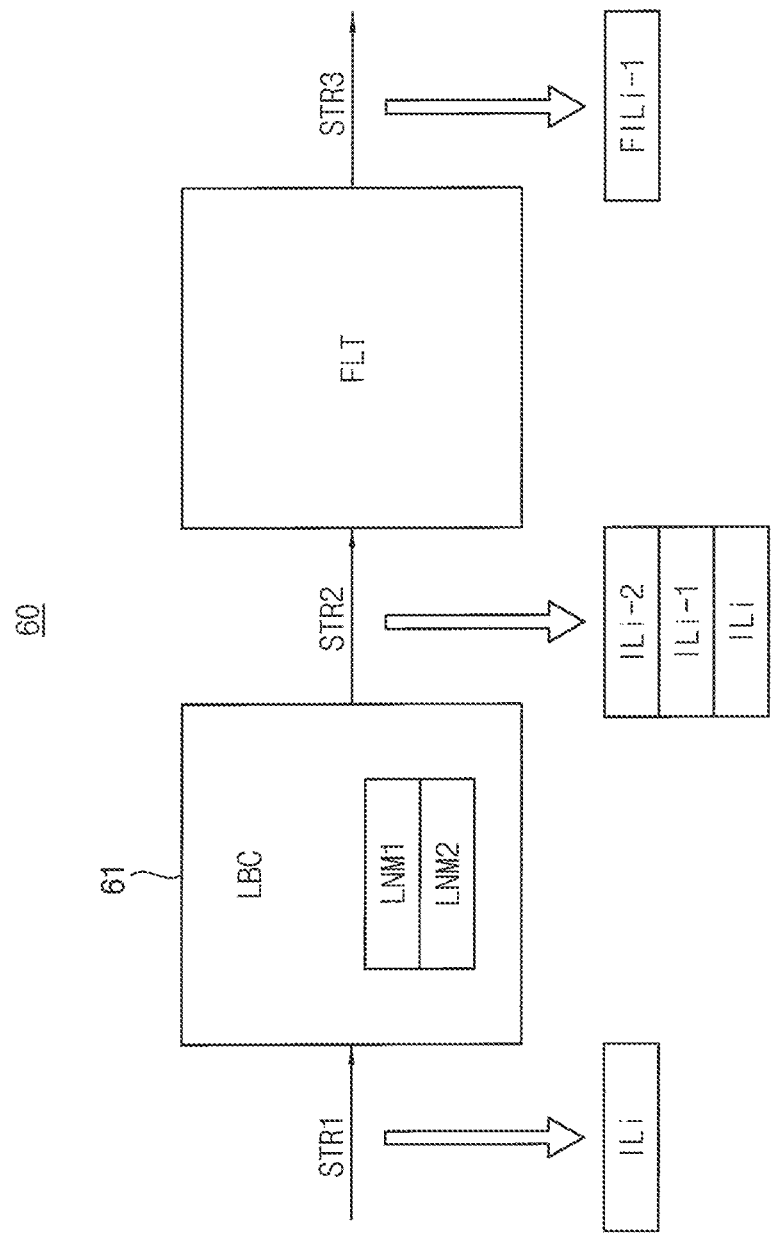
FIG. 10A is a block diagram illustrating an example of a delayed processing module included in an image signal processor according to example embodiments.
Figure 10B:
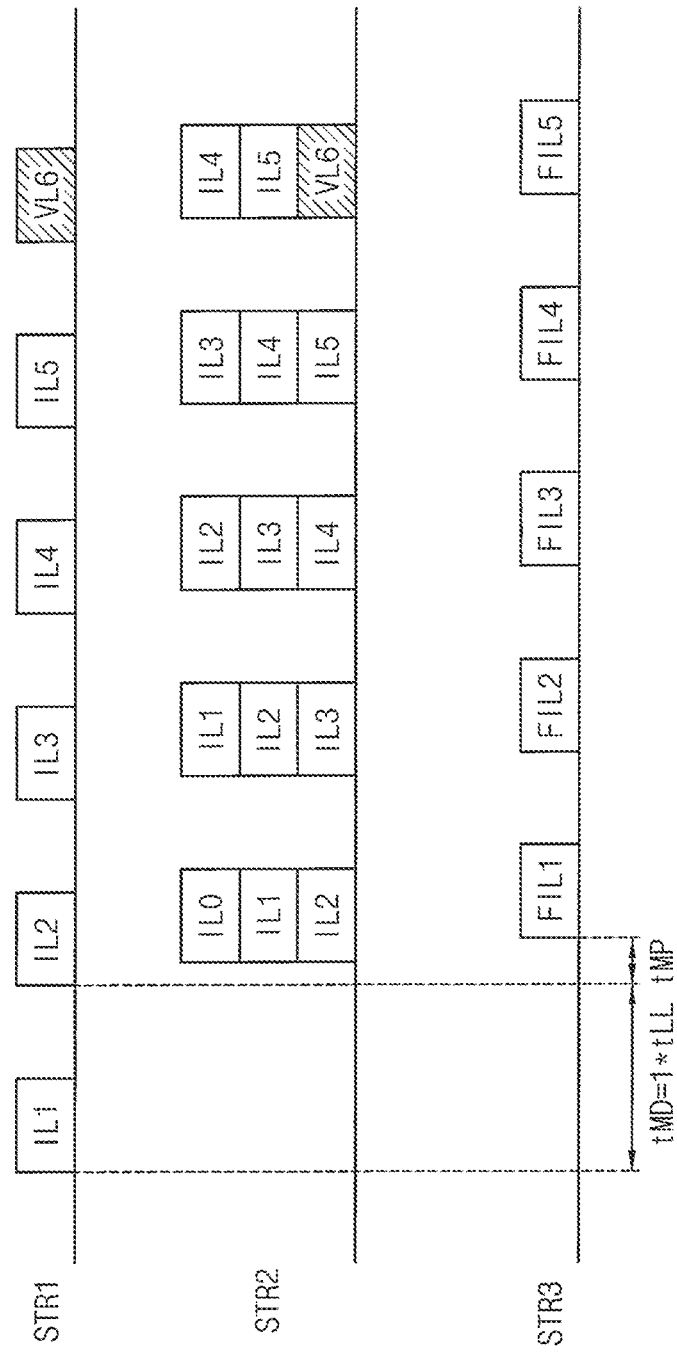
FIG. 10B is a timing diagram illustrating an operation of the delayed processing module of FIG. 10A.

FIG. 10A is a block diagram illustrating an example of a delayed processing module included in an image signal processor according to example embodiments, and FIG. 10B is a timing diagram illustrating an operation of the delayed processing module of FIG. 10A.

Referring to FIG. 10A, a delayed processing module 60 may include a line buffer control circuit LBC 61 and a filtering circuit FLT.

In comparison with the line buffer control circuit 51 in FIG. 9A, the line buffer control circuit 61 in FIG. 10A does not include the line drain circuit LDC. The configuration and the operation of the delayed processing module 60 of FIGS. 10A and 10B are the same or substantially the same as those of the delayed processing module 50 of FIGS. 9A and 9B except the delayed filtering operation on the end image data lines, and thus the repeated descriptions are omitted.

As illustrated in FIG. 10B, the delayed processing module 60 may perform the delayed filtering operation on the end image data line IL5 on the fly in synchronization with the virtual data line VL6 received from the line interleaving controller 100. In some embodiments, it is not required that the delayed processing module should stop receiving the data lines from the previous line interleaving controller 100 or the previous processing module for the delayed filtering operation on the end image data line IL5. Accordingly the line buffer control circuit 61 in FIG. 10A doesn't have to activate the stall signal STL as the line buffer control circuit 61 in FIG. 9A during the delayed filtering operation on the end image data line IL5. In other words, the image signal processor core including the delayed processing module 60 may receive the data lines from the line interleaving controller 100 while the delayed processing module in the image signal processor core performs the delayed filtering operation on the end image data line IL5.

As such, the line interleaving controller 100 according to example embodiments may generate the additional virtual data lines to reduce or prevent interference or collision between channels and efficiently support the TDM by units of lines. The generation and the order of data lines may be determined by the line interleaving controller 100 that precedes the pipeline circuit in the image signal processor core and the uncertainty of operations of the pipeline circuit may be removed. The delayed processing modules in the pipeline circuit may operate passively in synchronization with the image data lines and the virtual data lines provided from the line interleaving controller 100 and thus performance of the pipeline processing may be enhanced.

Figure 11:
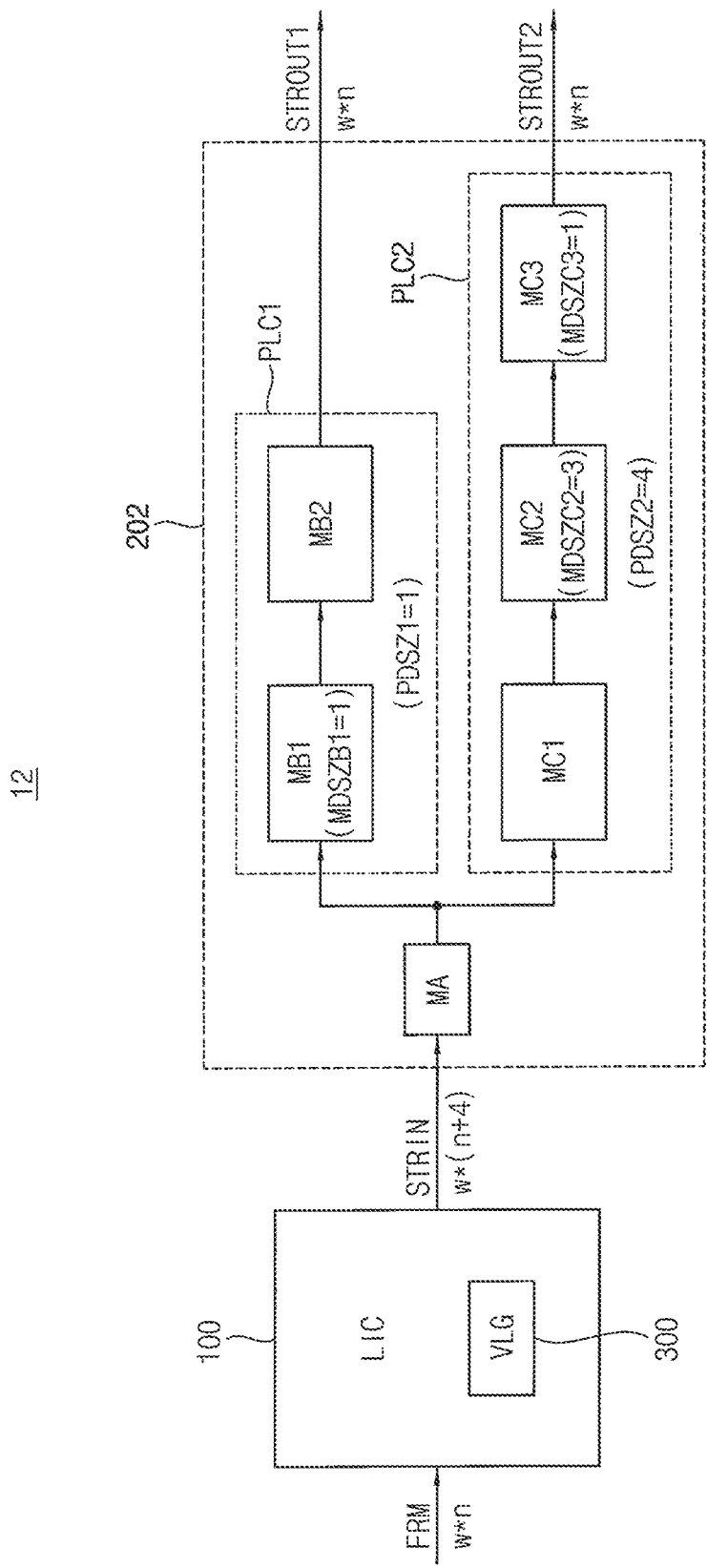
FIGS. 11 and 12 are block diagrams illustrating an image signal processor according to example embodiments.
Figure 12:
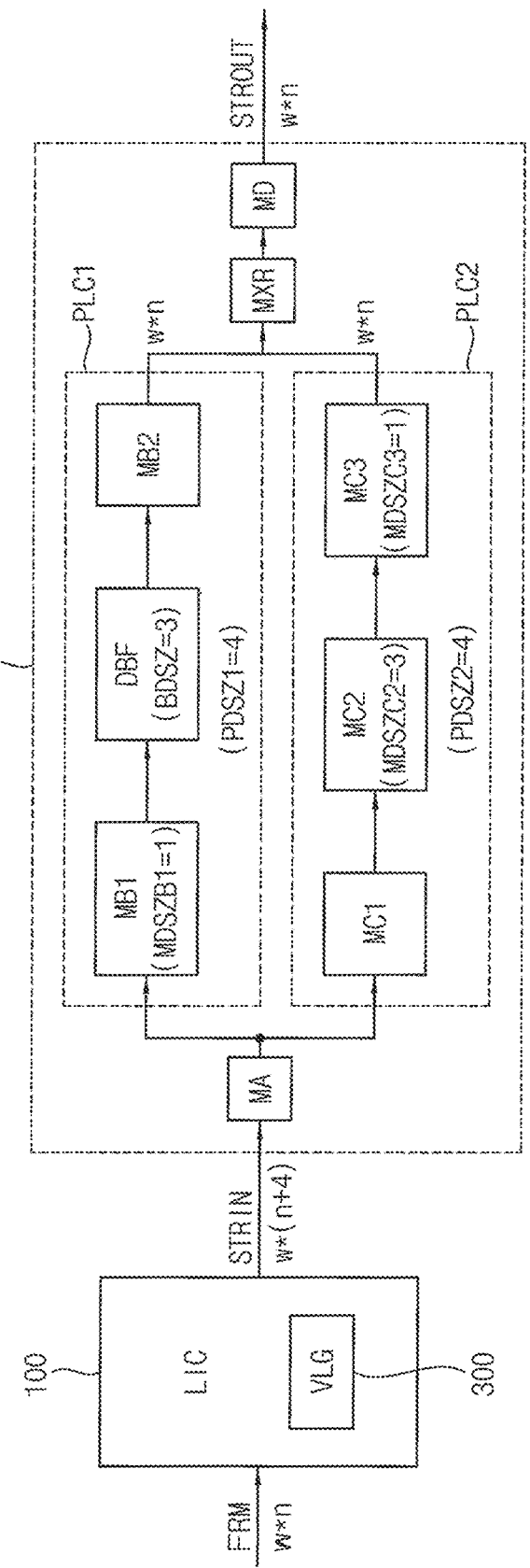

FIGS. 11 and 12 are block diagrams illustrating an image signal processor according to example embodiments.

Referring to FIG. 11, an image signal processor 12 may include a line interleaving controller LIC 100 and an image signal processor core 202. The line interleaving controller 100 may include a virtual line generator as described above.

The image signal processor core 202 may include processing modules MA, MB1, MB2, MC1, MC2 and MC3. The two processing modules MA1 and MA2 may form a first pipeline circuit PLC1 to generate a first output stream signal STROUT1, the three processing modules MC1, MC2 and MC3 may be connected in parallel with the first pipeline circuit PLC1 and form a second pipeline circuit PLC2 to generate a second output stream signal STROUT2.

As illustrated in FIG. 11, the first pipeline circuit PLC1 may include one first delayed processing module MB1 performing the delayed filtering operation as described above, and the second pipeline circuit PLC2 may include two second delayed processing modules MC2 and MC3. For example, the first delayed processing module MB1 may have a module delay size MDSZB1 of one, the one second delayed processing module MC2 may have a module delay size MDSZC2 of three, and the other second delayed processing module MC3 may have a module delay size MDSZC2 of one. In some embodiments, a first pipeline delay size PDSZ1 of the first pipeline circuit PLC1 may be one corresponding to the first module delay size MDSZB1 of the first delayed processing module MB1 included in the first pipeline circuit PLC1, and a second pipeline delay size PDSZ2 of the second pipeline circuit PLC2 may be four corresponding to a sum of the two second module delay sizes MDSZC2 and MDSZC3 of the second delayed processing modules MC2 and MC3 included in the second pipeline circuit PLC2.

The line interleaving controller 100 may generate and output the virtual data lines such that the number of the virtual data lines is equal to a greater one of the first pipeline delay size PDSZ1=1 and the second pipeline delay size PDSZ1=4. That is, the line interleaving controller 100 may generate and output four virtual data lines. The line interleaving controller 100 may receive an image frame FRM having the resolution of w*n by units of lines, where n indicates the line number of the image frame FRM and w indicates the pixel number per line of the image frame FRM. In other words, the image frame FRM may include n image data lines. The line interleaving controller 100 may generate an input stream signal STRIN by units of lines such that the input stream signal STRIN includes the n image data lines and the four virtual data lines. In other words, the input stream signal STRIN may include an extended image frame having the resolution of w*(n+4).

The image signal processor 202 may perform delayed processing passively in synchronization with the n image data lines and the four virtual data lines.

The first processing module MB1 in the first pipeline circuit PLC1 may perform the delayed filtering operation on the one end image data line of the image frame FRM using the one virtual data line among the four virtual data lines to generate a first output stream signal STROUT1 including an image frame having the resolution of w*n. The first processing module MB1 may neglect the three unused virtual data lines among the four virtual data lines.

The second processing modules MC2 in the second pipeline circuit PLC2 may perform the delayed filtering operation on the three end image data line of the image frame FRM using the three virtual data lines among the four virtual data lines and the second processing module MC3 may perform the delayed filtering operation on the one end image data line using the one virtual data line among the four virtual data lines to generate a second output stream signal STROUT2 including an image frame having the resolution of w*n. The number of the end image data lines may correspond to a maximum value among the module delay sizes MDSZC2 and MDSZC3 of the second delayed processing modules MC2 and MC3.

Am image signal processor 13 of FIG. 12 is similar to the image signal processor 12 of FIG. 11 and the repeated descriptions may be omitted.

In comparison with the image signal processor 12 of FIG. 11, the image signal processor 13 of FIG. 12 may further include a mixer MXR configured to mix the output of the first pipeline circuit PLC1 and the output of the second pipeline circuit PLC2 and a processing module MD configured to process the output of the mixer MXR.

It may be required to synchronize the output of the first pipeline circuit PLC1 and the output of the second pipeline circuit PLC2 line by line for the mixing operation of the mixer MXR. For such synchronization, the first pipeline circuit PLC1 may further include a delay buffer DBF on the pipeline path of the first pipeline circuit PLC1. The delay buffer DBF may delay received data lines without processing such that the first pipeline delay size PDSZ1 and the second pipeline delay size PDSZ2 may become equal to each other. In the example of FIG. 12, a delay size BDSZ of the delay buffer DBF may be set as three, and the first pipeline delay size PDSZ1 may be set as four that is equal to the second pipeline delay size PDSZ2.

Even though not illustrated in FIGS. 11 and 12, the image signal processors 202 and 203 may further include at least one processing module configured to perform a scaling operation and/or a crop operation to change the resolution of the image frame. In some embodiments, the module to change the resolution module may output the virtual data lines without processing as described with reference to FIGS. 7 and 8.

Figure 13:
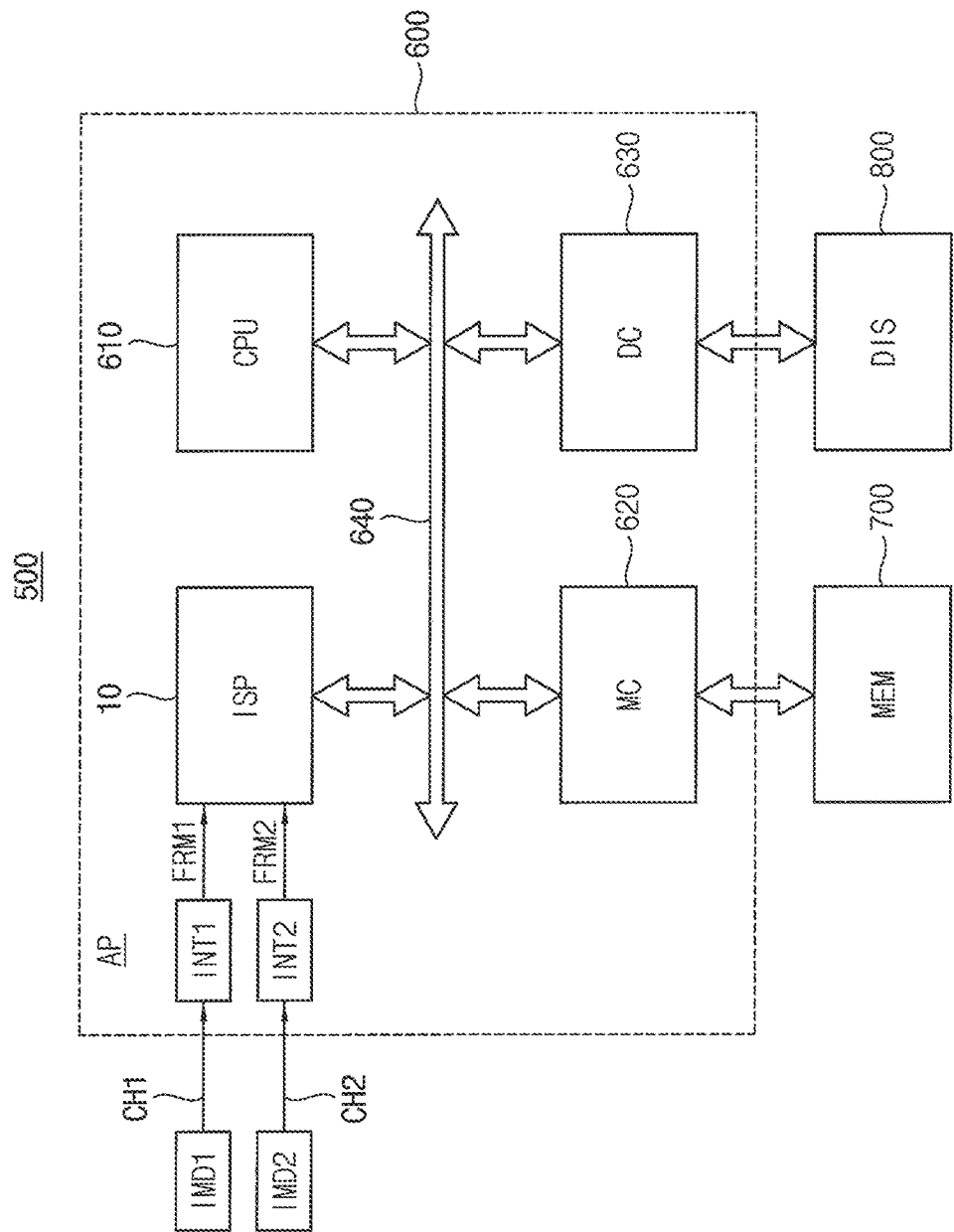
FIG. 13 is a block diagram illustrating a data processing system according to example embodiments.

FIG. 13 is a block diagram illustrating a data processing system according to example embodiments.

Referring to FIG. 13, a data processing system 500 may include an application processor (AP) 600, a plurality of imaging devices IMG1 and IMG2, an external memory MEM 700, and/or a display device DIS 800. The data processing system 500 may be implemented as, for example, a personal computer (PC) or a mobile computing device. The mobile computing device may be, for example, a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The AP 600 may be implemented as an integrated circuit (IC), a motherboard, a system on chip (SoC), a mobile AP, etc. The AP 600 may include bus architecture (or a bus) 640, a central processing unit (CPU) 610, a plurality of interfaces INT1 and INT2, an image signal processor (ISP) 10, a memory controller MC 20, and/or a display controller DC 630. The CPU 610, the ISP 10, the memory controller 620, and/or the display controller 630 may communicate a command and/or data with one another through the bus architecture 640. The bus architecture 640 may be implemented as, for example, a bus using an advanced microcontroller bus architecture (AMBA) protocol, a bus using an advanced high-performance bus (AHB) protocol, a bus using an advanced peripheral bus (APB) protocol, a bus using an AMBA extensible interconnect (AXI) protocol, or a combination thereof.

The CPU 610 may control the overall operation of the AP 610. For example, the CPU 610 may control the interfaces INT1 and INT2, the ISP 10, the memory controller 620, and the display controller 630. The CPU 610 may include at least one core.

The first interface INT1 may receive, for example, a first image and first control signals from a first imaging device IMD1 and transmit them to the ISP 10. The second interface INT2 may receive, for example, a second image and second control signals from a second imaging device IMD2 and transmit them to the ISP 10. The first image and the second image may be referred to as, for example, pictures, image data, image data stream, or image frames.

The first imaging device IMD1 and the second imaged device IMD2 may be implemented as, for example, a complementary metal oxide semiconductor (CMOS) image sensor chip or a camera module. The first imaging device IMD1 and IMD2 may transmit the first and second images and the first and second control signals to the first and second interfaces INT1 and INT2, respectively, using, for example, mobile industry processor interface (MIPI) camera serial interface (CSI). For example, the resolution of the first image may be different from that of the second image.

The ISP 10 may perform time-division multiplexing (TDM) on the first image and/or the second image. The TDM may not be performed in units of image frames. Instead, the TDM may be performed in units of lines without using the external memory 700.

For example, the ISP 10 may perform the image frames output from the imaging devices IMD1 and IMD2 on the fly with the TDM scheme by units of lines. According to example embodiments, the ISP 10 may include a line interleaving controller 100 and an image signal processor core as described above such that the line interleaving controller 100 generates virtual data lines and the image signal processor core processes one or more end image data lines included in end portions of the frame images using the virtual data lines.

For example, the image signal processor core may perform at least one among auto dark level compensation, bad pixel replacement, noise reduction, lens shading compensation, color correction, RGB gamma correction, edge enhancement, hue control, and color suppression.

The memory controller 620 may store data, which have been processed by the ISP 10 in TDM mode, in the external memory 700 according to the control of the CPU 610. The display controller 630 may transmit data (e.g., frame data) from the external memory 700 to the display device 800 according to the control of the CPU 610. For example, the display controller 630 may transmit data (e.g., frame data) from the external memory 700 to the display device 800 using, for example, MIPI display serial interface (DSI) or embedded DisplayPort (eDP).

Figure 14:
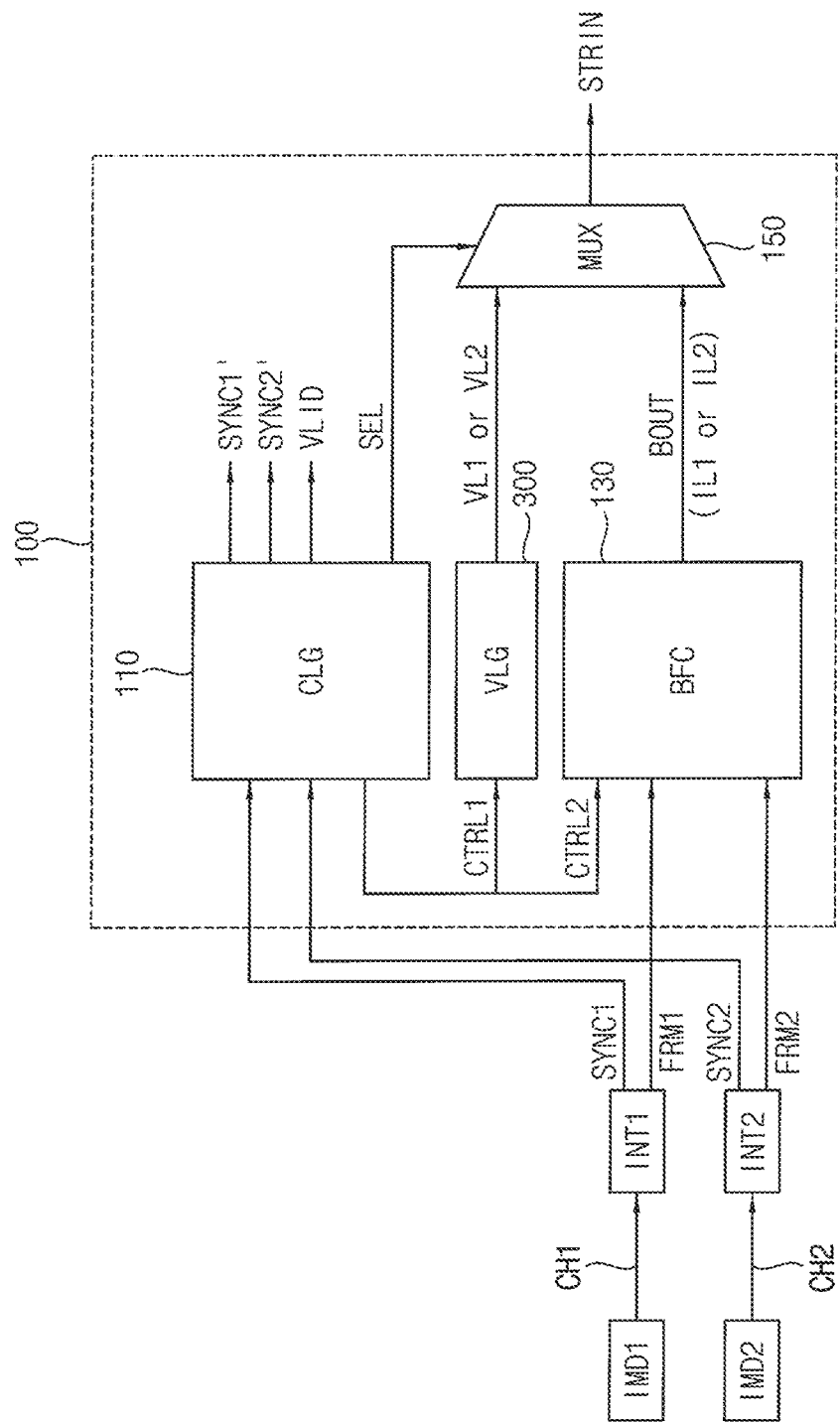
FIG. 14 is a block diagram illustrating a line interleaving controller according to example embodiments.

FIG. 14 is a block diagram illustrating a line interleaving controller 100 according to example embodiments.

Referring to FIG. 14, a line interleaving controller 100 may include a virtual line generator VLG 300, a control logic circuit CLG 110, a buffer circuit BFC 130 and/or a multiplexer MUX 150.

The buffer circuit 130 may buffer a plurality of first image data lines in a first image frame FRM1 provided from a first imaging device IMD1 through a first channel CH1 and a first interface INT1 and a plurality of second image data lines in a second image frame FRM2 provided from a second imaging device IMD2 through a second channel CH2 and a second interface INT2 to generate a buffer output signal including the first image data lines IL1 and the second image data lines IL2.

The virtual line generator 300 may generate first virtual data lines VL1 corresponding to the first image frame FRM1 and second virtual data lines VL2 corresponding to the second image frame FRM2, and selectively output the first virtual data line or the second virtual data line as each time. The multiplexer 150 may output an input stream signal STRIN by selecting the output of the buffer circuit 130 and the output of the virtual line generator 300.

The control logic circuit 110 may control overall operations of the buffer circuit 130, the virtual line generator 300 and/or the multiplexer 150. The control logic circuit 110 may generate a first control signal CTRL1 to control the virtual line generator 300, a second control signal CTRL2 to control the buffer circuit 130, and a selection signal SEL to control the multiplexer 150, based on a first synchronization SYNC1 provided through the first channel CH1 and a second synchronization SYNC2 provided through the second channel CH2. In addition, the control logic circuit 110 may generate a third synchronization signal SYNC1', a fourth synchronization signal SYNC2' and a virtual line identification signal VLID for the operation of the image signal processor core that is disposed next to the line interleaving controller 100.

The synchronization signals may include a vertical synchronization signal indicating start and end timings of transferring each image frame, a horizontal synchronization signal indicating start and end timings of transferring each data line, a clock signal, a data enable signal, etc.

As described above, the first virtual data lines VL1 may be used in processing the end image data lines of the first image frame FRM1 and the second virtual data lines VL2 may be used in processing the end image data lines of the second image frame FRM2.

Figure 15:
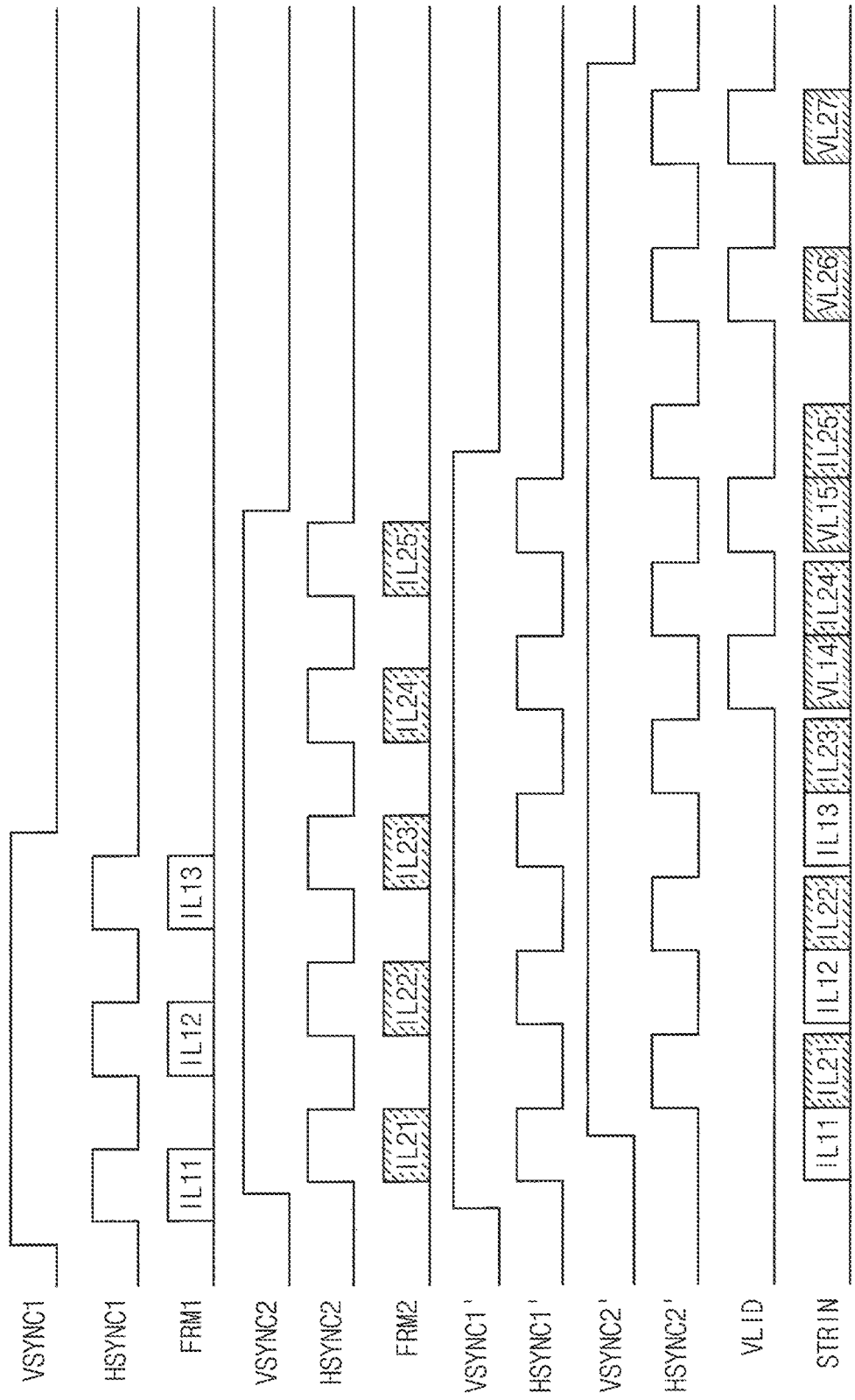
FIG. 15 is a timing diagram illustrating an operation of the line interleaving controller of FIG. 14.

FIG. 15 is a timing diagram illustrating an operation of the line interleaving controller 100 of FIG. 14.

The first image frame FRM1, the second image frame FRM2 and the input stream signal STRIN are the same as described with reference to FIG. 6, and the repeated descriptions are omitted.

Referring to FIGS. 14 and 15, while a first vertical synchronization signal VSYNC1 is activated, a first horizontal synchronization signal HSYNC1 may be activated repeatedly and the first image data lines IL11~IL13 may be transferred from the first imaging device IMD1 to the line interleaving controller 100 in synchronization with the activations of the first horizontal synchronization signal HSYNC1. In the same way, while a second vertical synchronization signal VSYNC2 is activated, a second horizontal synchronization signal HSYNC2 may be activated repeatedly and the second image data lines IL21~IL25 may be transferred from the second imaging device IMD2 to the line interleaving controller 100 in synchronization with the activations of the second horizontal synchronization signal HSYNC2.

The control logic circuit 110 in the line interleaving controller 100 may generate a third vertical synchronization VSYNC1' and a third horizontal synchronization signal HSYNC1' that are synchronization with the first image data lines IL11~IL13 and the first virtual data lines VL14 and VL14 included in the input stream signal STRIN and generate a fourth vertical synchronization VSYNC2' and a fourth horizontal synchronization signal HSYNC2' that are synchronization with the second image data lines IL21~IL25 and the second virtual data lines VL26 and VL27 included in the input stream signal STRIN, which are provided to the image signal processor core.

The third vertical synchronization VSYNC1', the third horizontal synchronization signal HSYNC1', the fourth vertical synchronization VSYNC2' and the fourth horizontal synchronization signal HSYNC2' may correspond to a channel identification signal indicating whether a present data in the input stream signal STRIN corresponds to the first image frame FRM1 or the second image frame FRM2. The image signal processor core may perform independently processing of the first image frame FRM1 and processing of the second image frame FRM2 based on the channel identification signal.

In addition, the control logic circuit 110 in the line interleaving controller 100 may generate a virtual line identification signal VLID indicating whether a present data line in the input stream signal STRIN correspond to the image data line or the virtual data line. The image signal processor core may perform processing of the end image data lines of the first image frame FRM1 and the second image frame FRM2 based on the virtual line identification signal VLID.

FIG. 16 through 19 are diagrams illustrating example embodiments of a buffer circuit included in a line interleaving controller 100 according to example embodiments.

Figure 16:
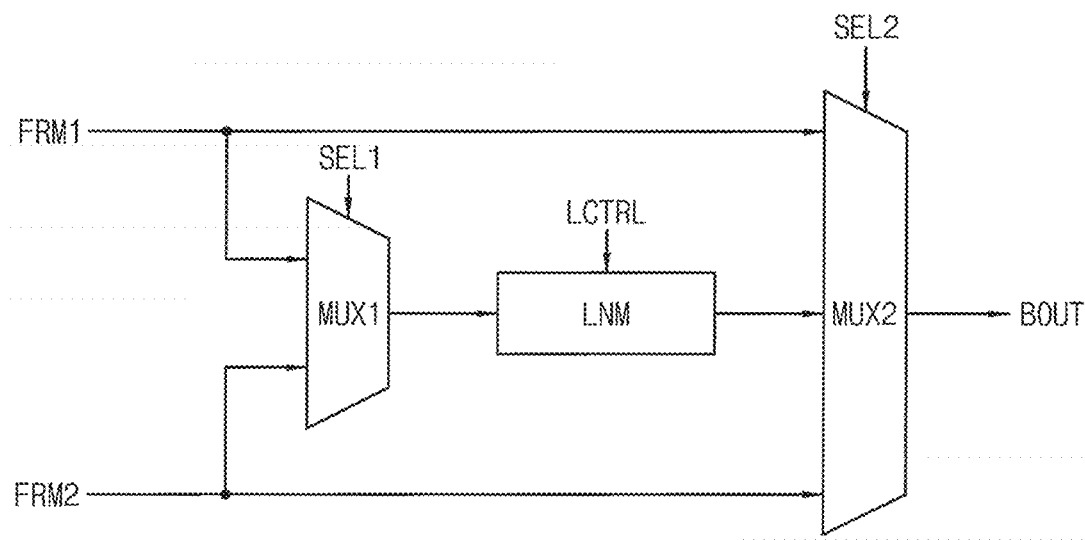
FIG. 16 through 19 are diagrams illustrating example embodiments of a buffer circuit included in a line interleaving controller according to example embodiments.

Referring to FIG. 16, a buffer circuit 131 may include a first multiplexer MUX1, a line buffer LNM and/or a second multiplexer MUX2. The first multiplexer MUX1 may selectively output the first image data line of the first image frame FRM1 or the second image data line of the second image frame FRM2 at each time based on a first selection signal SEL1. The line buffer LNM may store one image data line output from the first multiplexer MUX1 based on a buffering control signal LCTRL and output the stored image data line. The second multiplexer MUX2 may selectively output the first image data line of the first image frame FRM1, the second image data line of the second image frame FRM2 and the image data line output from the line buffer LNM at each time based on a second selection signal SEL2 to generate the buffer output signal BOUT. The first selection signal SEL1, the second selection signal SEL2 and the buffering control signal LCTRL may be included in the first control signal CTRL1 generated by the control logic circuit 110.

The buffer circuit 131 of FIG. 16 may temporarily store one image data line in the line buffer LNM when the transfer time interval of the first image data line and the transfer time interval of the second image data line are overlapped so as to implement the TDM of the first image frame FRM1 and the second image frame FRM2 on the fly.

Figure 17:
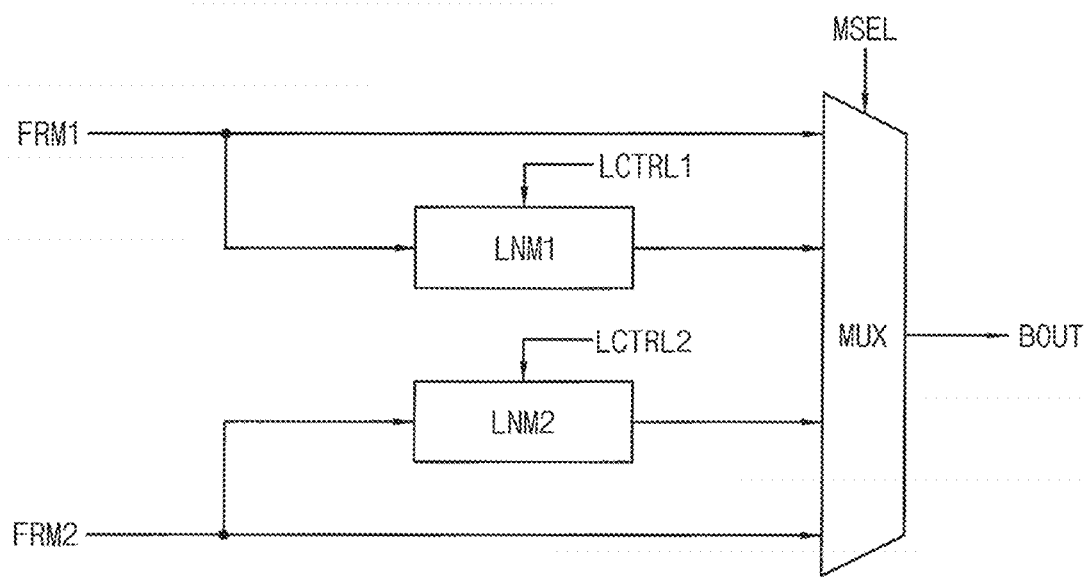

Referring to FIG. 17, a buffer circuit 132 may include a first line buffer LNM1, a second line buffer LNM2 and/or a multiplexer MUX. The first line buffer LNM1 may store one first image data line of the first image frame FRM1 based on a first buffering control signal LCTRL1 and output the stored first image data line. The second line buffer LNM2 may store one second image data line of the second image frame FRM2 based on a second buffering control signal LCTRL2 and output the stored second image data line. The multiplexer MUX may selectively output the first image data line of the first image frame FRM1, the second image data line of the second image frame FRM2, the first image data line output from the first line buffer LNM1 and the second image data line output from the second line buffer LNM2 at each time based on a selection signal MSEL to generate the buffer output signal BOUT. The selection signal MSEL, the first buffering control signal LCTRL1 and the second buffering control signal LCTRL2 may be included in the first control signal CTRL1 generated by the control logic circuit 110.

The buffer circuit 132 of FIG. 17 may temporarily store one image data line in the first line buffer LNM1 or the second line buffer LNM2 when the transfer time interval of the first image data line and the transfer time interval of the second image data line are overlapped so as to implement the TDM of the first image frame FRM1 and the second image frame FRM2 on the fly.

Figure 18:
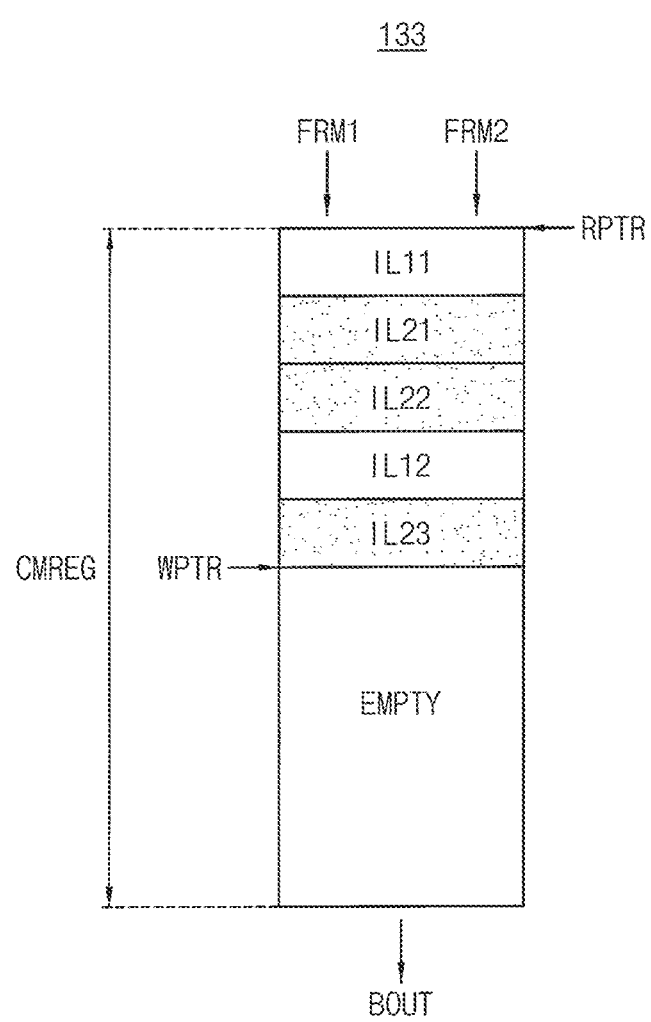

Referring to FIG. 18, a buffer circuit 133 may include a common memory region CMREG configured to store the first image data lines IL11 and IL12 and the second image data lines IL21, IL22 and IL23 according to a reception order that the buffer circuit 133 receives the first image data lines IL11 and IL12 and the second image data lines IL21, IL22 and IL23. The control logic circuit 110 may sequentially change a write pointer WPTR indicating a position of storing the image data line that is presently received by the buffer circuit 133.

The control logic circuit 110 may control the buffer circuit 133 such that the buffer circuit 133 generates the buffer output signal BOUT by outputting, according to the reception order, the first image data lines IL11 and IL12 and the second image data lines IL21, IL22 and IL23 stored in the common memory region CMREG. The control logic circuit 110 may sequentially change a read pointer RPTR indicating a position of reading the image data line that is to be output from the buffer circuit 133.

The TDM of the first image frame FRM1 and the second image frame FRM2 by units of lines may be performed in the first-in first out (FIFO) scheme using the buffer circuit 133 of FIG. 18.

Figure 19:
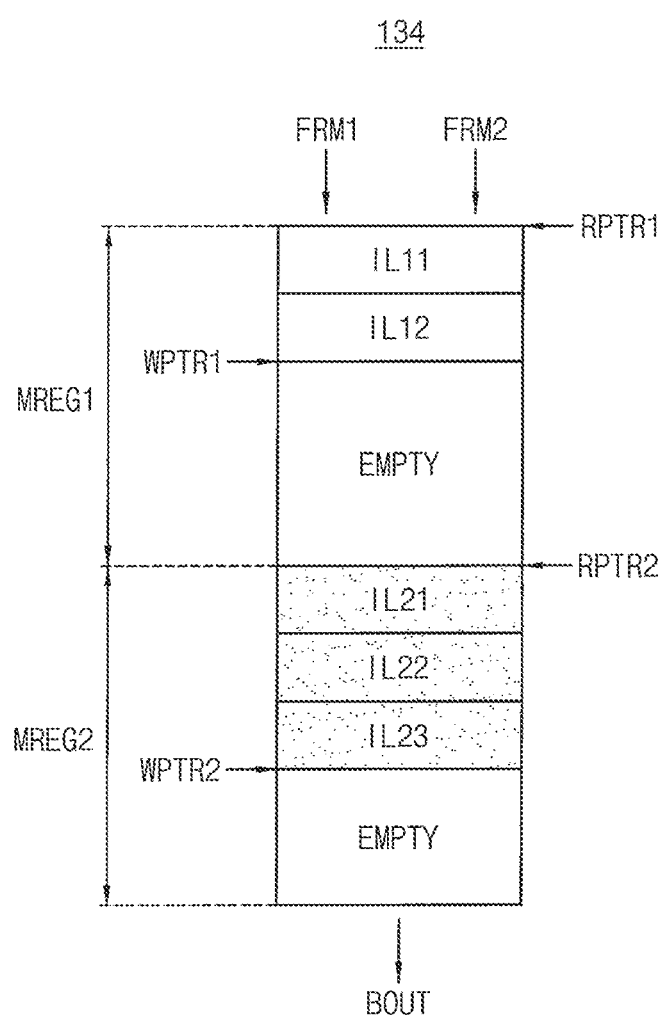

Referring to FIG. 19, a buffer circuit 134 may include a first memory region MREG1 and a second memory region MREG2. The buffer circuit 134 may sequentially store the first image data lines IL11 and IL12 in the first memory region MREG1 according a first reception order that the buffer circuit receives the first image data lines IL11 and IL12, and store the second image data lines IL21, IL22 and IL23 in the second memory region MREG2 according a second reception order that the buffer circuit 134 receives the second image data lines IL21, IL22 and IL23. The control logic circuit 110 may sequentially change a first write pointer WPTR1 indicating a position of storing the first image data line that is presently received by the buffer circuit 134, and sequentially change a second write pointer WPTR2 indicating a position of storing the second image data line that is presently received by the buffer circuit 134.

The control logic circuit 110 may determine a priority order of the first image data lines stored IL11 and IL12 in the first memory region MREG1 and the second image data lines IL21, IL22 and IL23 stored in the second memory region MREG2 and control the buffer circuit 134 such that the buffer circuit 134 generates the buffer output signal BOUT by outputting, according to the priority order, the first image data lines IL11 and IL12 stored in the first memory region MREG1 and the second image data lines IL21, IL22 and IL23 stored in the second memory region MREG2. The control logic circuit 110 may sequentially change a fist read pointer RPTR1 indicating a position of reading the first image data line that is to be output from the buffer circuit 134, and sequentially change a second read pointer RPTR2 indicating a position of reading the second image data line that is to be output from the buffer circuit 134.

The processing order of the first image frame FRM1 and the second image frame FRM2 provided through the different channels may be determined adaptively using the buffer circuit 134 of FIG. 19. The control logic circuit 110 may determine the priority order based on the frame rates, importance degrees, etc. of the first image frame FRM1 and the second image frame FRM2.

Figure 20:
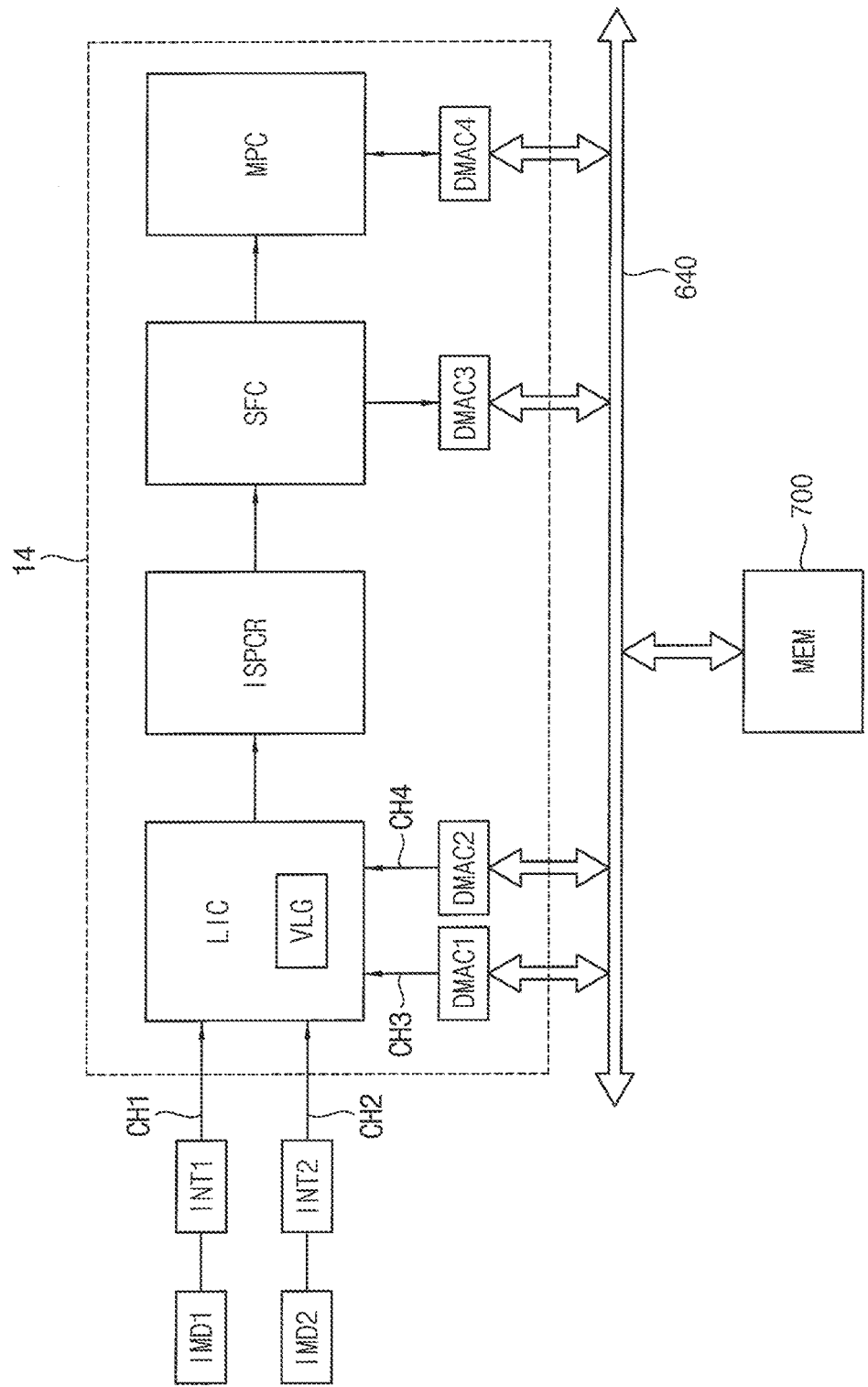
FIG. 20 is block diagram illustrating an image signal processor according to example embodiments.

FIG. 20 is block diagram illustrating an image signal processor according to example embodiments. Also a first imaging device IMD1, a second imaging device IMD2, a first interface INT1 and a second interface INT2, a bus 40 and a memory device 700 are illustrated in FIG. 20.

Referring to FIG. 20, an image signal processor 14 may include a line interleaving controller LIC, image signal processor core ISPCR, a scaling and formatting circuit SFC, a multimedia processing circuit MPC and/or a direct memory access controllers DMAC1~DMAC4. The line interleaving controller LIC may include a virtual line generator VLC.

In some example embodiments, the line interleaving controller LIC may receive the first image frame and the second image frame from the first imaging device IMD1 and the second imaging device IMD2 through a first channel CH1 and a second channel CH2, respectively. In some example embodiments, the line interleaving controller LIC may receive the first image frame and the second image frame from the memory device 700 through a third channel CH3 and a fourth channel CH4 under control of the direct memory access controllers DMAC1 and DMAC2, respectively.

The scaling and formatting circuit SFC may perform a scaling operation with respect to the data output from the image signal processor core ISPCR, changes the format of the scaled data and generate the formatted data. The scaling operation may include a scale-up operation and/or a scale-down operation. The direct memory access controller DMAC3 may store the data processed by the scaling and formatting circuit SFC in the memory device 700 through the bus 640.

The scaling and formatting circuit SFC may transfer the processed data to the multimedia processing circuit MPC. The multimedia processing circuit MPC may further process the received data. The multimedia processing circuit MPC may read or fetch the data stored in the memory device 700 and store the processed data in the memory device 700 using the direct memory access controller DMAC4.

Figure 21:
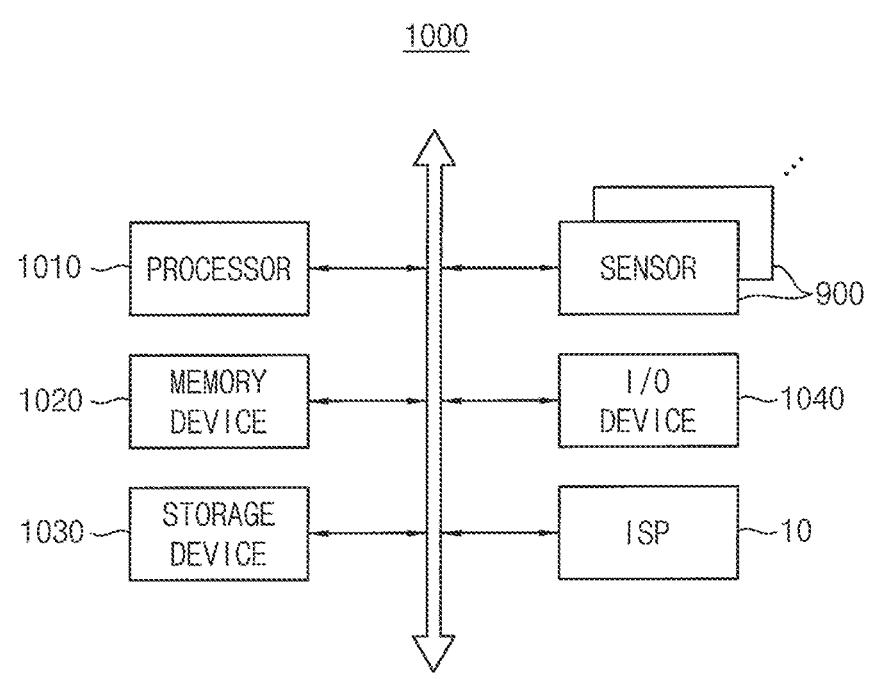
FIG. 21 is a block diagram illustrating a computing system according to example embodiments.

FIG. 21 is a block diagram illustrating a computing system according to example embodiments.

Referring to FIG. 21, a computing system 1000 may include a processor 1010, a memory device 1020, a storage device 1030, an input/output (I/O) device 1040, an image signal processor (ISP) 10, and/or a plurality of image sensors 900. Even though not illustrated in FIG. 21, the computing system 1000 may further include ports configured to communicate with external devices.

The processor 1010 may perform various calculations and tasks. According to some embodiments, the processor 1010 may be a microprocessor or a central processing unit (CPU). The memory device 1020 may store data for operating the computing system 1000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device 1030 may include a solid state drive (SSD), a hard disk drive (HDD), a compact-disc read-only memory (CD-ROM), etc. The input/output device 1040 may include an input device, such as a keyboard, a keypad, a mouse, etc., and an output device, such as a printer, a display device, etc.

Any of the elements disclosed above, for example but not limited to, the line interleaving controller, the image signal processor, and the application processor, may include or be implemented in processing circuitry (either separately or combined) such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The image signal processor 10 may include a line interleaving controller LIC to generate virtual data lines and an image signal processor core including a pipeline structure as described above. The virtual data lines may be provided to the image signal processor core to process the end image data lines included in the end portion of the image frame in synchronization with the virtual data lines. Thus the interference between channels may be reduced or prevented efficiently.

The inventive concepts may be applied to any electronic devices and systems that require processing of image signals. For example, the inventive concepts may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, an in-vehicle infotainment (IVI) system, a drone, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. A system for processing image data, the system comprising:

a bus;
a plurality of imaging devices connected to the bus and configured to provide a plurality of image frames, each image frame including a plurality of image data lines;
a plurality of interfaces connected to the bus and configured to respectively receive the plurality of image frames through a plurality of channels;
a line interleaving controller configured to
 receive the plurality of image data lines included in each image frame from each interface,
 generate a number of virtual data lines corresponding to each image frame, and
 output the plurality of image data lines and the virtual data lines; and
an image signal processor core including at least one pipeline circuit, the pipeline circuit including a plurality of processing modules serially connected to sequentially process data lines received from the line interleaving controller, the image signal processor core configured to process one or more end image data lines included in an end portion of each image frame based on the virtual data lines.

2. The system of claim 1, wherein the plurality of interfaces are implemented with mobile industry processor interface (MIPI) or camera serial interface (CSI).

3. The system of claim 1, further comprising:
an application processor connected to the bus,
wherein the line interleaving controller and the image signal processor core are included in the application processor.

4. The system of claim 1, wherein the line interleaving controller determines a number of virtual data lines based on module delay sizes of one or more delayed processing modules, each module delay size indicating a number of delay data lines of each delayed processing module.

5. The system of claim 4, wherein the plurality of processing modules include:
the one or more delayed processing modules, each configured to perform a delayed filtering operation on a target data line to be processed based on one or more delayed data lines received after the target data line.

6. The system of claim 5, wherein the image signal processor core is configured to perform the delayed filtering operation on the end image data lines on the fly in synchronization with the virtual data lines received from the line interleaving controller, and
wherein the image signal processor is configured to receive data lines from the line interleaving controller while the image signal processor core performs the delayed filtering operation on the end image data lines.

7. The system of claim 1, wherein the line interleaving controller is configured to:
receive a plurality of first image data lines included in a first image frame through a first channel and a plurality of second image data lines included in a second image frame through a second channel;
generate one or more first virtual data lines corresponding to the first image frame and one or more second virtual data lines corresponding to the second image frame; and
transfer the plurality of first image data lines, the plurality of second image data lines, the first virtual data lines, and the second virtual data lines sequentially line by line with a time-division multiplexing (TDM) scheme to the image signal processor core.

8. The system of claim 7, wherein the line interleaving controller is configured to transfer, as a stream signal to the image signal processor core, the plurality of first image data lines, the plurality of second image data lines, the first virtual data lines, and the second virtual data lines.

9. The system of claim 8, wherein the line interleaving controller is configured to transfer the stream signal to the image signal processor core while the image signal processor core processes the end image data lines of the first image frame or the second image frame.

10. A method of processing image data, the method comprising:
receiving, using a plurality of interfaces, a plurality of external synchronization signals through a plurality of channels;
receiving, using the plurality of interfaces, a plurality of image frames through the plurality of channels in synchronization with the plurality of synchronization signals such that each image frame includes a plurality of image data lines;
generating a number of virtual data lines corresponding to each image frame;
generating a stream signal that sequentially includes each of the plurality of image data lines and the virtual data lines; and
processing one or more end image data lines included in an end portion of each image frame based on the virtual data lines.

11. The method of claim 10, further comprising:
generating a virtual line identification signal indicating whether a present data line in the stream signal corresponds to the image data line or the virtual data line.

12. The method of claim 11, further comprising:
generating a plurality of internal synchronization signals that are synchronized with the image data lines and the virtual data lines included in the stream signal.

13. A line interleaving controller comprising:
a buffer circuit configured to receive a first control signal and buffer a plurality of first image data lines included in a first image frame received through a first channel and a plurality of second image data lines included in a second image frame received through a second channel to selectively output each first image data line or each second image data line based on the first control signal;
a virtual line generator configured to
 receive a second control signal, and
 generate first virtual data lines corresponding the first image frame and second virtual data lines corresponding to the second image frame based on a determined number and the second control signal;
a multiplexer configured to receive a selection signal and output a stream signal by selecting an output of the buffer circuit and an output of the virtual line generator based on the selection signal; and
a control logic circuit configured to receive a first synchronization signal received through the first channel and a second synchronization signal received through the second channel and generate the first control signal, the second control signal and the selection signal to control the buffer circuit, the virtual line generator and the multiplexer based on the first synchronization signal and the second synchronization signal,
wherein the first virtual data lines are used to process one or more end image data lines included in an end portion of the first image frame, and the second virtual data lines are used to process one or more end image data lines included in an end portion of the second image frame.

14. The line interleaving controller of claim 13, wherein the control logic circuit is configured to generate a third synchronization signal that is synchronized with the first image data lines and the first virtual data lines included in the stream signal and generate a fourth synchronization signal that is synchronized with the second image data lines and the second virtual data lines included in the stream signal.

15. The line interleaving controller of claim 13, wherein the control logic circuit is configured to generate a virtual line identification signal indicating whether a present data line in an input stream signal corresponds to one of the first image data line and the second image data line or one of the first virtual data line and the second virtual data line.

16. The line interleaving controller of claim 13, wherein the control logic circuit includes:

a common memory region configured to store the first image data lines and the second image data lines according to a reception order that the buffer circuit receives the first image data lines and the second image data lines.

17. The line interleaving controller of claim 16, wherein the control logic circuit is configured to:

sequentially change a write pointer indicating a position of storing the first image data line or the second image data line that is presently received by the buffer circuit; and sequentially change a read pointer indicating a position of reading the first image data line or the second image data line that is to be output from the buffer circuit.

18. The line interleaving controller of claim 13, wherein the control logic circuit includes:

a first memory region configured to store the first image data lines according a first reception order that the buffer circuit receives the first image data lines; and a second memory region configured to store the second image data lines according a second reception order that the buffer circuit receives the second image data lines.

19. The line interleaving controller of claim 18, wherein the control logic circuit is configured to:

sequentially change a first write pointer indicating a position of storing the first image data line that is presently received by the buffer circuit;

sequentially change a second write pointer indicating a position of storing the second image data line that is presently received by the buffer circuit;

sequentially change a fist read pointer indicating a position of reading the first image data line that is to be output from the buffer circuit; and sequentially change a second read pointer indicating a position of reading the second image data line that is to be output from the buffer circuit.

* * * * *